US012639967B2

(12) United States Patent
Popov et al.

(10) Patent No.: US 12,639,967 B2
(45) Date of Patent: May 26, 2026

(54) SYSTEMS AND METHODS FOR DETECTING AND RECOGNIZING A RAILCAR IDENTIFIER

(71) Applicant: Nice North America LLC, Carlsbad, CA (US)

(72) Inventors: Ilya Vladimirovich Popov, Nizhny Novgorod (RU); Irina Aleksandrovna Nizamova, Nizhniy Novgorod (RU); Krishna Khadloya, San Jose, CA (US)

(73) Assignee: Nice North America LLC, Carlsbad, CA (US)

( * ) Notice: Subject to any disclaimer, the term of this patent is extended or adjusted under 35 U.S.C. 154(b) by 263 days.

(21) Appl. No.: 18/347,281

(22) Filed: Jul. 5, 2023

(65) Prior Publication Data

US 2025/0014370 A1     Jan. 9, 2025

(51) Int. Cl.
*G06V 30/00* (2022.01)
*G06V 10/82* (2022.01)
*G06V 30/14* (2022.01)

(52) U.S. Cl.
CPC .......... *G06V 30/1448* (2022.01); *G06V 10/82* (2022.01)

(58) Field of Classification Search
CPC .... G06V 30/1448; G06V 10/82; G06V 10/25; G06V 20/54; G06V 20/62; G06V 30/1463; G06V 30/10; B61L 25/025; B61L 23/041
See application file for complete search history.

(56) References Cited

U.S. PATENT DOCUMENTS

| | | | |
|---|---|---|---|
| 3,887,559 A | 6/1975 | Hardtmann | |
| 2012/0051643 A1* | 3/2012 | Ha | B61L 25/04 |
| | | | 382/182 |
| 2017/0304339 A1 | 10/2017 | Sardiello | |
| 2020/0206177 A1 | 7/2020 | Pahan et al. | |
| 2020/0349498 A1* | 11/2020 | Brooks | G06V 30/1448 |
| 2022/0009535 A1* | 1/2022 | Weiner | G06T 19/20 |
| 2024/0386270 A1* | 11/2024 | Mills | B61L 23/00 |

FOREIGN PATENT DOCUMENTS

| | | |
|---|---|---|
| WO | 02/065989 A2 | 8/2002 |
| WO | 2009/114729 A2 | 9/2009 |

OTHER PUBLICATIONS

Zhang et al, An Effective Method for Automated Railcar No. Detection and Recognition Based on Deep Learning, 2021 IEEE Canadian Conference on Electrical and Computer Engineering (CCECE) (Year: 2021).*

(Continued)

*Primary Examiner* — Xiao Liu

(74) *Attorney, Agent, or Firm* — Fox Rothschild LLP

(57) ABSTRACT

Systems and techniques for detecting and recognizing a railcar identifier are described herein. An image of a railcar can be captured by an image sensor and provided to processing circuitry of a controller. A bounded portion of the image corresponding to the railcar identifier can be identified and a character recognition process can be performed to identify respective values for characters of the railcar identifier. A check digit can be computed using the identified values to validate the railcar identifier. In some examples, the bounded portion of the image can be automatically adjusted when the check digit fails to validate the railcar identifier.

20 Claims, 18 Drawing Sheets

(56)     References Cited

OTHER PUBLICATIONS

Liu et al, Wagon Number Recognition Based on the YOLOv3 Detector, 2019 IEEE 2nd International Conference on Computer and Communication Engineering Technology (CCET) (Year: 2019).*

Zhou et al, EAST: an efficient and accurate scene text detector, in Proc. CVPR, Honolulu, HI, USA, Jul. 21-26, pp. 2642-2651. (Year: 2017).*

Yang et al., "Synthesis of tricyclic quinazolinones via intramolecular cyclization of 3-(2-aminoalkyl)-2-(phenylamino) quinazolin-4(3H)-ones," Molecular Diversity, vol. 20, pp. 551-556 (2015).

International Search Report for International Application No. PCT/US2023/61044 dated Jun. 26, 2023.

* cited by examiner

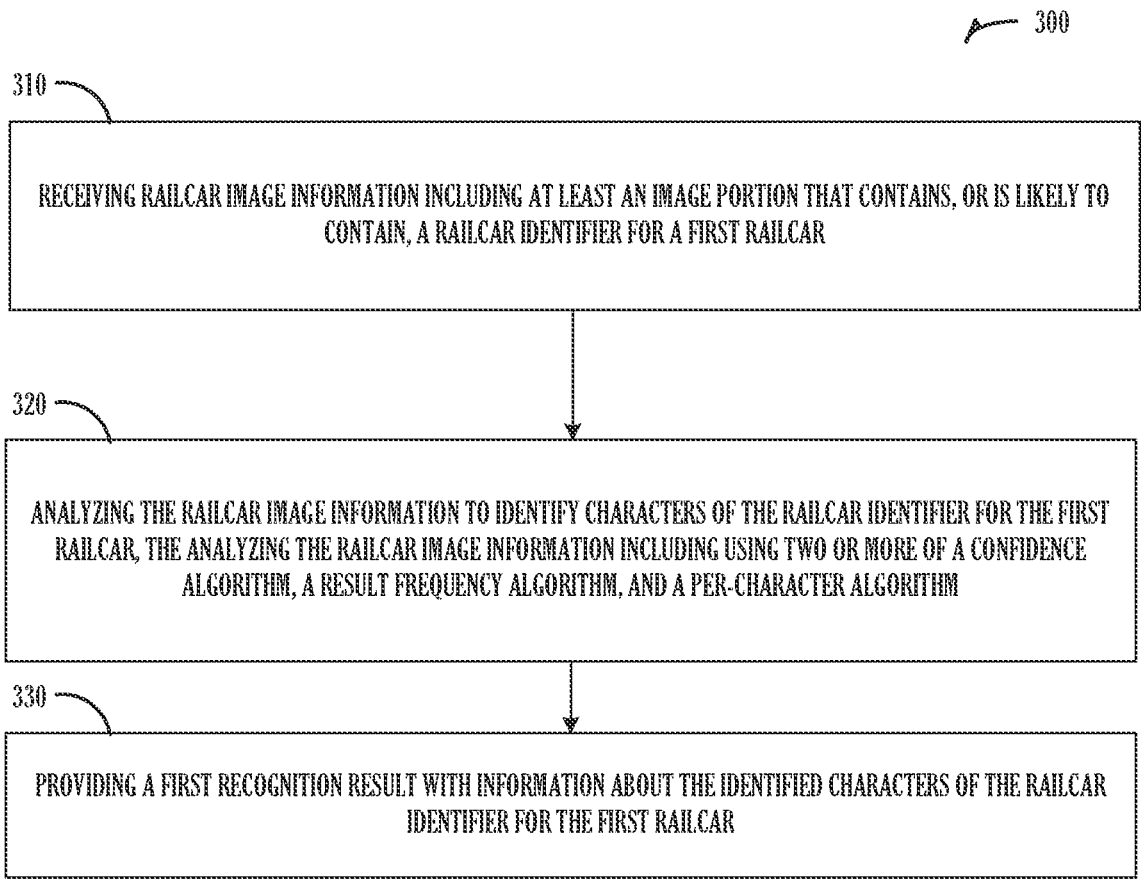

*— 300*

310 — RECEIVING RAILCAR IMAGE INFORMATION INCLUDING AT LEAST AN IMAGE PORTION THAT CONTAINS, OR IS LIKELY TO CONTAIN, A RAILCAR IDENTIFIER FOR A FIRST RAILCAR

320 — ANALYZING THE RAILCAR IMAGE INFORMATION TO IDENTIFY CHARACTERS OF THE RAILCAR IDENTIFIER FOR THE FIRST RAILCAR, THE ANALYZING THE RAILCAR IMAGE INFORMATION INCLUDING USING TWO OR MORE OF A CONFIDENCE ALGORITHM, A RESULT FREQUENCY ALGORITHM, AND A PER-CHARACTER ALGORITHM

330 — PROVIDING A FIRST RECOGNITION RESULT WITH INFORMATION ABOUT THE IDENTIFIED CHARACTERS OF THE RAILCAR IDENTIFIER FOR THE FIRST RAILCAR

IMAGE INPUT UNIT

403

404

RAILCAR IDENTIFIER REGION DETECTION AND REFINEMENT UNIT

405

CHARACTER SCANNING UNIT

406

CHARACTER EXTRACTION UNIT

407

IDENTIFIER BUILDER

408

RAILCAR IDENTIFIER VALIDATION AND REFINEMENT UNIT

RAILCAR IDENTIFIER TRACKER

409

410

DATABASE

411

POST-PROCESSOR

602

IMAGES WITH MARKED RAILCAR
IDENTIFIERS

604

CROPS OF IMAGES WITH MARKUP OF BOUNDING BOX CORNERS
WITH AUGMENTATIONS

600

606

TRAINING OF BOUNDING BOX POSITION FINE-TUNING MODULE

608

INTEGRATING THE BOUNDING BOX POSITION FINE-TUNING MODULE INTO THE RAILCAR IDENTIFIER DETECTION AND
RECOGNITION SYSTEM

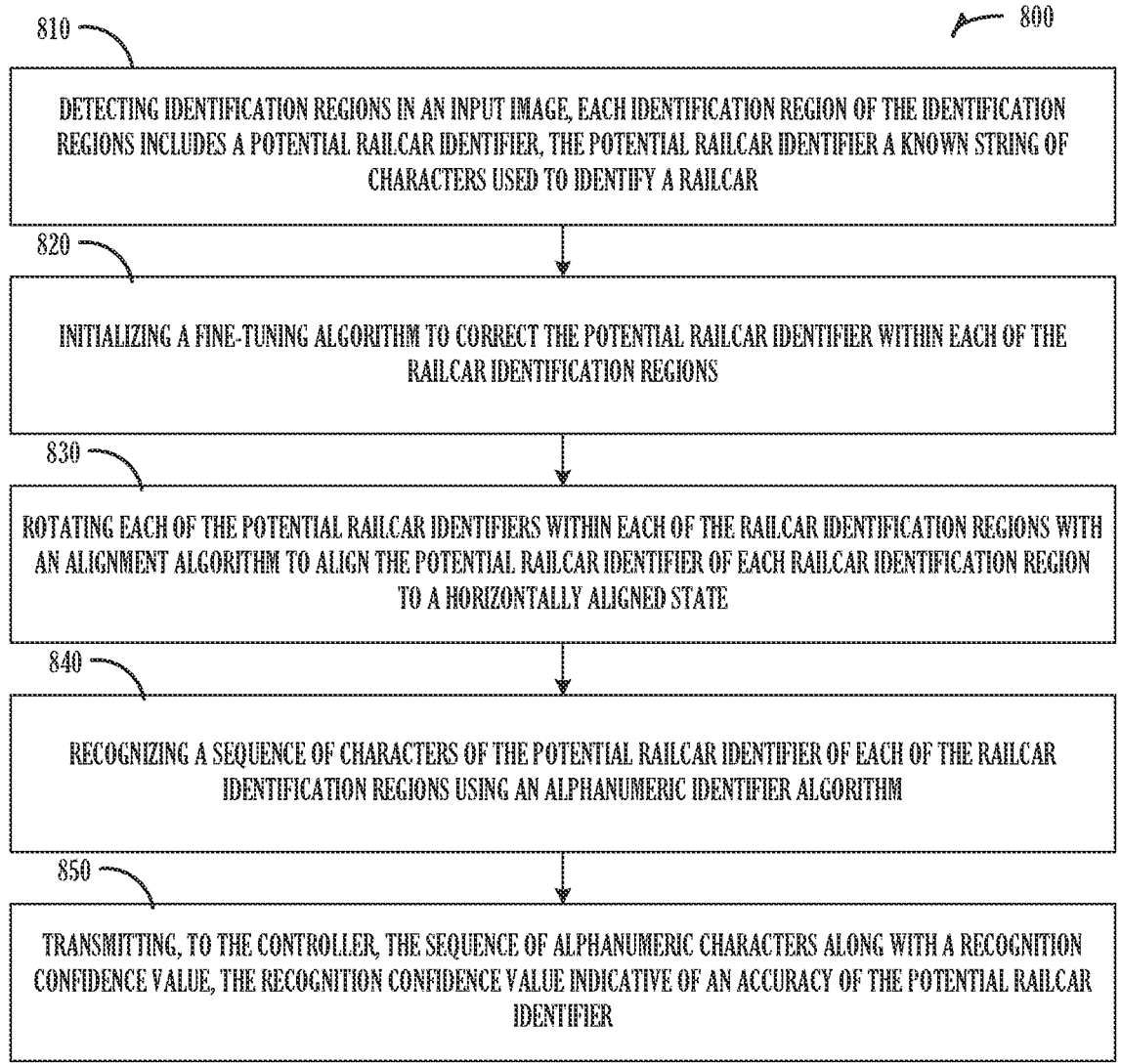

810 — DETECTING IDENTIFICATION REGIONS IN AN INPUT IMAGE, EACH IDENTIFICATION REGION OF THE IDENTIFICATION REGIONS INCLUDES A POTENTIAL RAILCAR IDENTIFIER, THE POTENTIAL RAILCAR IDENTIFIER A KNOWN STRING OF CHARACTERS USED TO IDENTIFY A RAILCAR

820 — INITIALIZING A FINE-TUNING ALGORITHM TO CORRECT THE POTENTIAL RAILCAR IDENTIFIER WITHIN EACH OF THE RAILCAR IDENTIFICATION REGIONS

830 — ROTATING EACH OF THE POTENTIAL RAILCAR IDENTIFIERS WITHIN EACH OF THE RAILCAR IDENTIFICATION REGIONS WITH AN ALIGNMENT ALGORITHM TO ALIGN THE POTENTIAL RAILCAR IDENTIFIER OF EACH RAILCAR IDENTIFICATION REGION TO A HORIZONTALLY ALIGNED STATE

840 — RECOGNIZING A SEQUENCE OF CHARACTERS OF THE POTENTIAL RAILCAR IDENTIFIER OF EACH OF THE RAILCAR IDENTIFICATION REGIONS USING AN ALPHANUMERIC IDENTIFIER ALGORITHM

850 — TRANSMITTING, TO THE CONTROLLER, THE SEQUENCE OF ALPHANUMERIC CHARACTERS ALONG WITH A RECOGNITION CONFIDENCE VALUE, THE RECOGNITION CONFIDENCE VALUE INDICATIVE OF AN ACCURACY OF THE POTENTIAL RAILCAR IDENTIFIER

FIG. 8

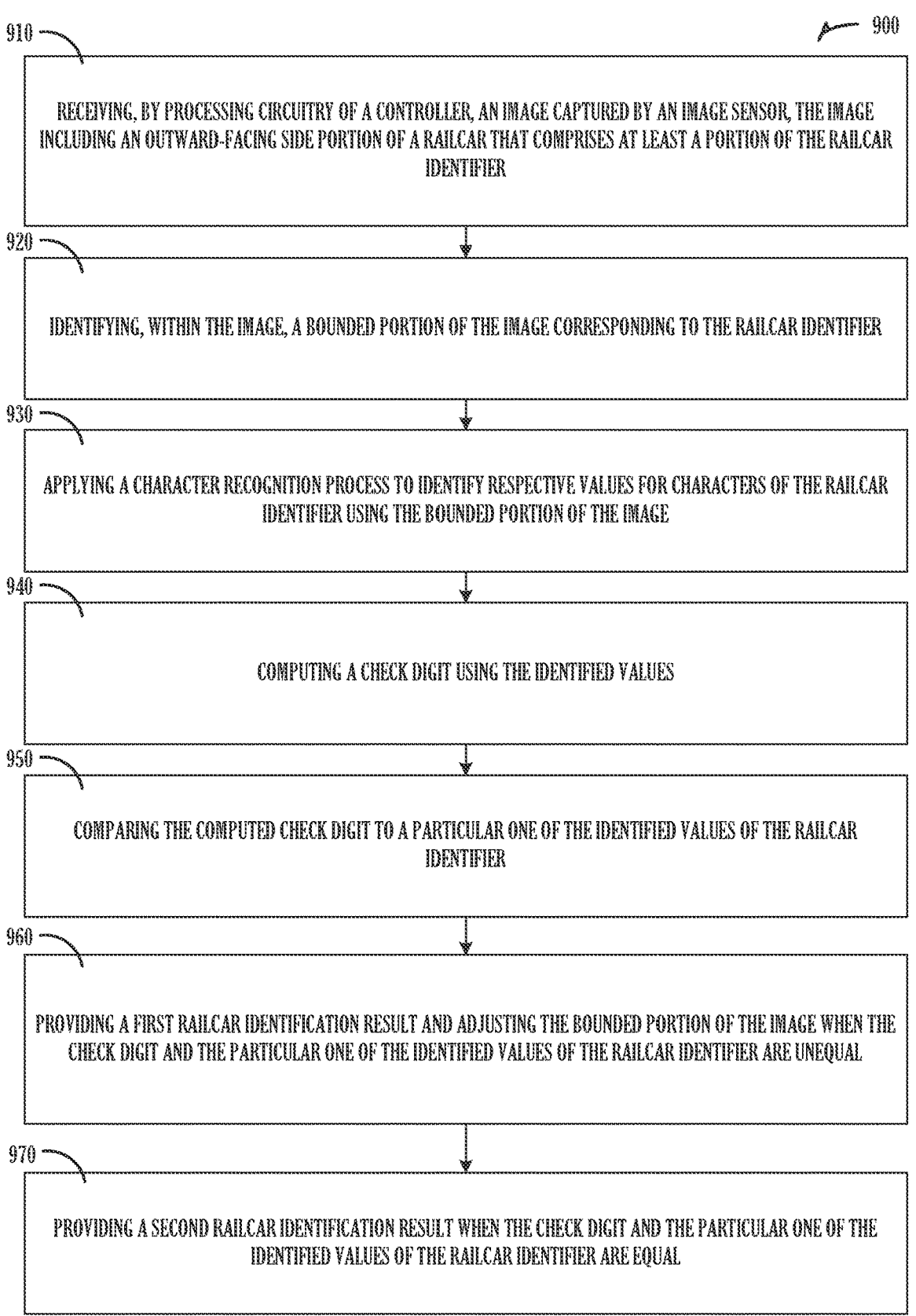

910

900

RECEIVING, BY PROCESSING CIRCUITRY OF A CONTROLLER, AN IMAGE CAPTURED BY AN IMAGE SENSOR, THE IMAGE INCLUDING AN OUTWARD-FACING SIDE PORTION OF A RAILCAR THAT COMPRISES AT LEAST A PORTION OF THE RAILCAR IDENTIFIER

920

IDENTIFYING, WITHIN THE IMAGE, A BOUNDED PORTION OF THE IMAGE CORRESPONDING TO THE RAILCAR IDENTIFIER

930

APPLYING A CHARACTER RECOGNITION PROCESS TO IDENTIFY RESPECTIVE VALUES FOR CHARACTERS OF THE RAILCAR IDENTIFIER USING THE BOUNDED PORTION OF THE IMAGE

940

COMPUTING A CHECK DIGIT USING THE IDENTIFIED VALUES

950

COMPARING THE COMPUTED CHECK DIGIT TO A PARTICULAR ONE OF THE IDENTIFIED VALUES OF THE RAILCAR IDENTIFIER

960

PROVIDING A FIRST RAILCAR IDENTIFICATION RESULT AND ADJUSTING THE BOUNDED PORTION OF THE IMAGE WHEN THE CHECK DIGIT AND THE PARTICULAR ONE OF THE IDENTIFIED VALUES OF THE RAILCAR IDENTIFIER ARE UNEQUAL

970

PROVIDING A SECOND RAILCAR IDENTIFICATION RESULT WHEN THE CHECK DIGIT AND THE PARTICULAR ONE OF THE IDENTIFIED VALUES OF THE RAILCAR IDENTIFIER ARE EQUAL

FIG. 9

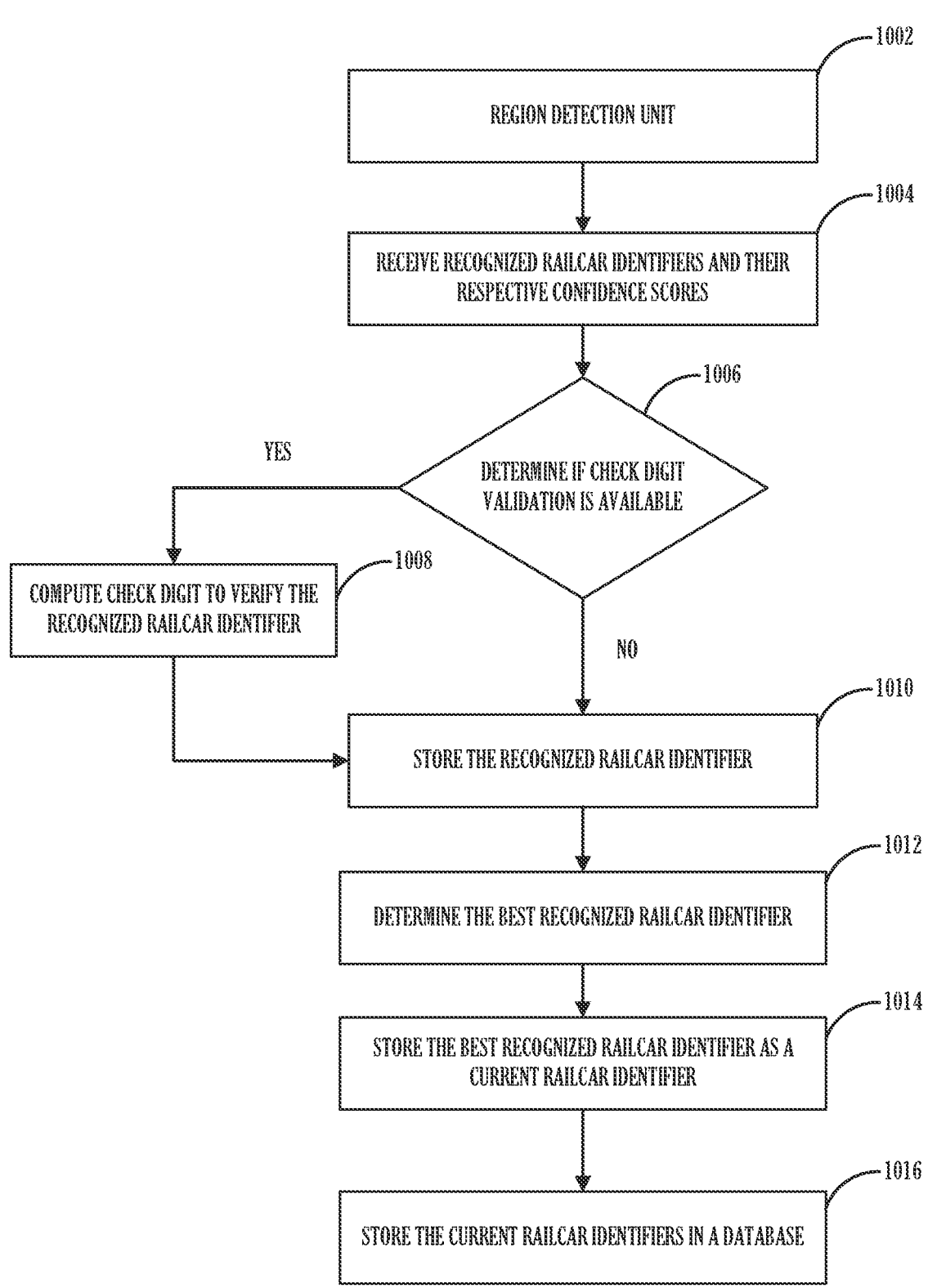

REGION DETECTION UNIT — 1002

RECEIVE RECOGNIZED RAILCAR IDENTIFIERS AND THEIR RESPECTIVE CONFIDENCE SCORES — 1004

DETERMINE IF CHECK DIGIT VALIDATION IS AVAILABLE — 1006

YES

COMPUTE CHECK DIGIT TO VERIFY THE RECOGNIZED RAILCAR IDENTIFIER — 1008

NO

STORE THE RECOGNIZED RAILCAR IDENTIFIER — 1010

DETERMINE THE BEST RECOGNIZED RAILCAR IDENTIFIER — 1012

STORE THE BEST RECOGNIZED RAILCAR IDENTIFIER AS A CURRENT RAILCAR IDENTIFIER — 1014

STORE THE CURRENT RAILCAR IDENTIFIERS IN A DATABASE — 1016

FIG. 10

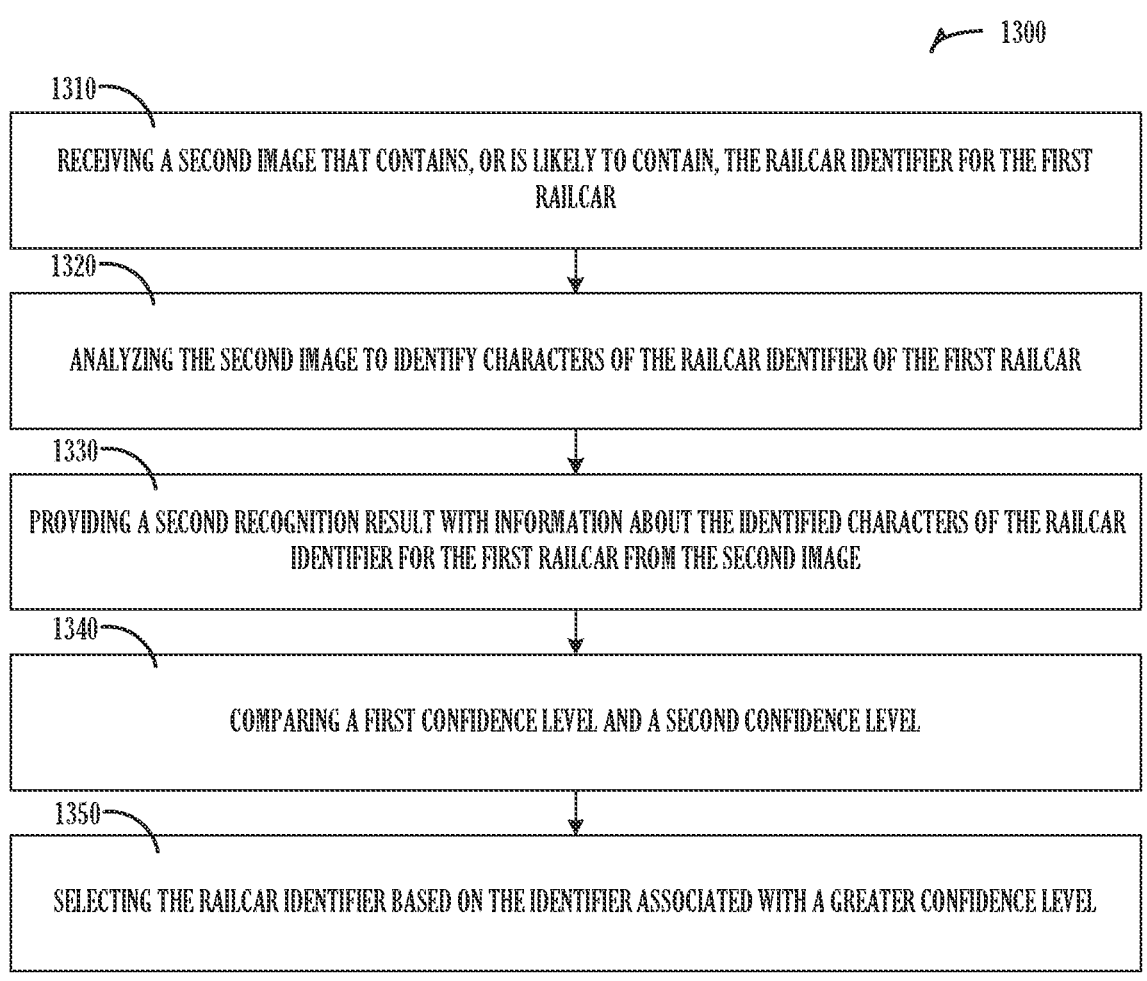

1300

1310 — RECEIVING A SECOND IMAGE THAT CONTAINS, OR IS LIKELY TO CONTAIN, THE RAILCAR IDENTIFIER FOR THE FIRST RAILCAR

1320 — ANALYZING THE SECOND IMAGE TO IDENTIFY CHARACTERS OF THE RAILCAR IDENTIFIER OF THE FIRST RAILCAR

1330 — PROVIDING A SECOND RECOGNITION RESULT WITH INFORMATION ABOUT THE IDENTIFIED CHARACTERS OF THE RAILCAR IDENTIFIER FOR THE FIRST RAILCAR FROM THE SECOND IMAGE

1340 — COMPARING A FIRST CONFIDENCE LEVEL AND A SECOND CONFIDENCE LEVEL

1350 — SELECTING THE RAILCAR IDENTIFIER BASED ON THE IDENTIFIER ASSOCIATED WITH A GREATER CONFIDENCE LEVEL

FIG. 13

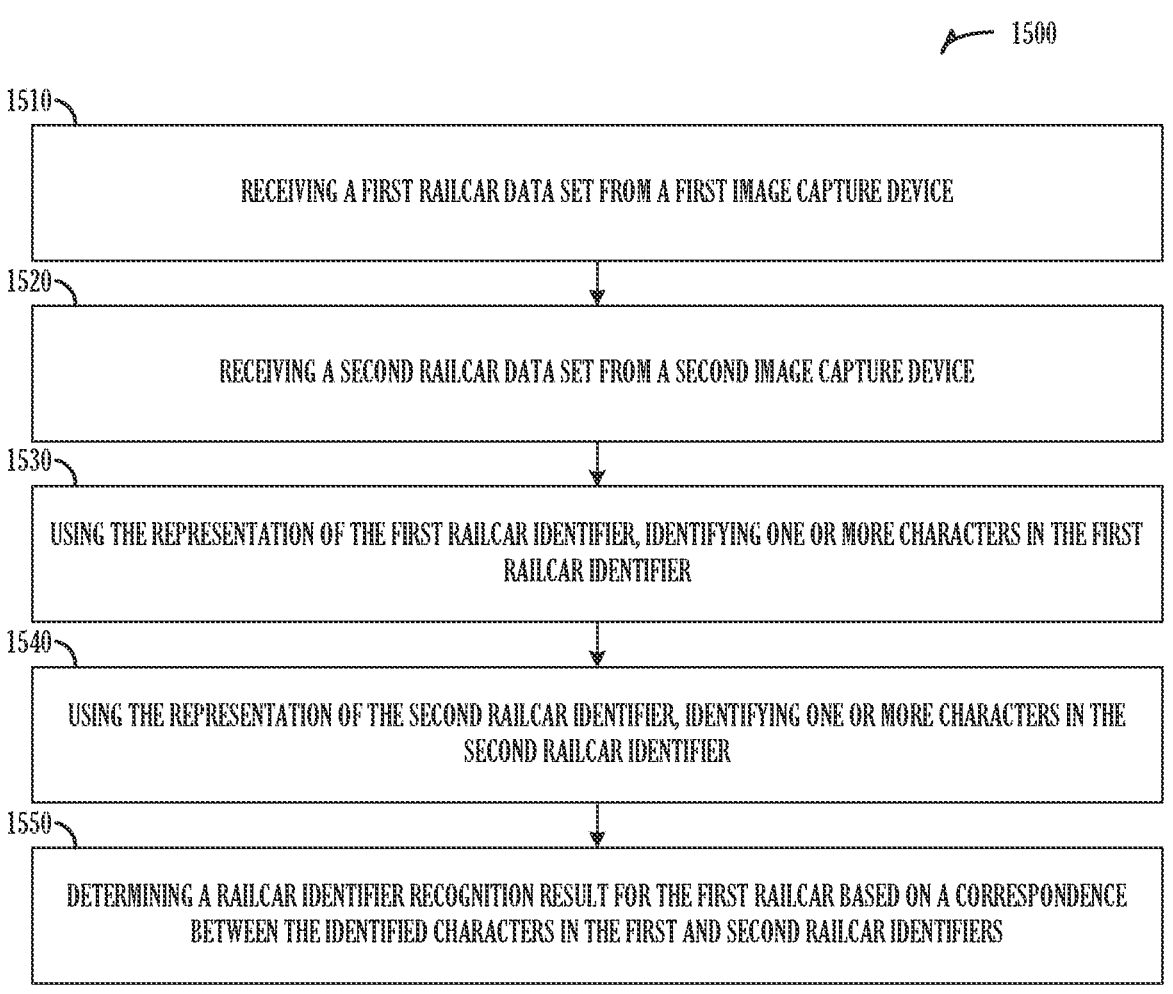

1500

1510
RECEIVING A FIRST RAILCAR DATA SET FROM A FIRST IMAGE CAPTURE DEVICE

1520
RECEIVING A SECOND RAILCAR DATA SET FROM A SECOND IMAGE CAPTURE DEVICE

1530
USING THE REPRESENTATION OF THE FIRST RAILCAR IDENTIFIER, IDENTIFYING ONE OR MORE CHARACTERS IN THE FIRST RAILCAR IDENTIFIER

1540
USING THE REPRESENTATION OF THE SECOND RAILCAR IDENTIFIER, IDENTIFYING ONE OR MORE CHARACTERS IN THE SECOND RAILCAR IDENTIFIER

1550
DETERMINING A RAILCAR IDENTIFIER RECOGNITION RESULT FOR THE FIRST RAILCAR BASED ON A CORRESPONDENCE BETWEEN THE IDENTIFIED CHARACTERS IN THE FIRST AND SECOND RAILCAR IDENTIFIERS

FIG. 15

SYSTEMS AND METHODS FOR DETECTING AND RECOGNIZING A RAILCAR IDENTIFIER

TECHNICAL FIELD

Examples described herein generally relate to systems and methods for detecting and recognizing a railcar identifier.

BACKGROUND

Railcar identifier detection and recognition is a technology that can use railcar identifier detection approaches followed by optical character recognition (OCR) on images to read registration numbers that can help to identify a railcar. Railcar identifier detection and recognition (RIDR) systems are mostly used for the automatic registration and management of railcars throughout transit. Railcar identifier detection and recognition systems can be used to count railcars, or to update railcar routing, such as based on feedback from a distributed chain of railcar identifier detection and recognition systems. The same or similar railcar identifier detection and recognition systems and methods can be similarly applied to other vehicles or objects with unique identifiers.

BRIEF DESCRIPTION OF THE DRAWINGS

Various examples are illustrated in the figures of the accompanying drawings. Such examples are demonstrative and not intended to be exhaustive or exclusive examples of the present subject matter.

FIG. 3 is a diagram illustrating a method of detecting and recognizing a railcar identifier, according to an example of the present disclosure.

FIG. 8 is a diagram illustrating a method of adjusting a representative railcar identifier, according to an example of the present disclosure.

FIG. 9 is a diagram illustrating a method of detecting and recognizing a railcar identifier, according to an example of the present disclosure.

FIG. 10 is a diagram illustrating a method of identifying a railcar identifier, according to an example of the present disclosure.

FIG. 13 is a diagram illustrating a method of selecting a railcar identifier based on a confidence level, according to an example of the present disclosure.

FIG. 15 is a diagram illustrating a method of determining a railcar identifier recognition result, according to an example of the present disclosure.

DETAILED DESCRIPTION

Figure 1:
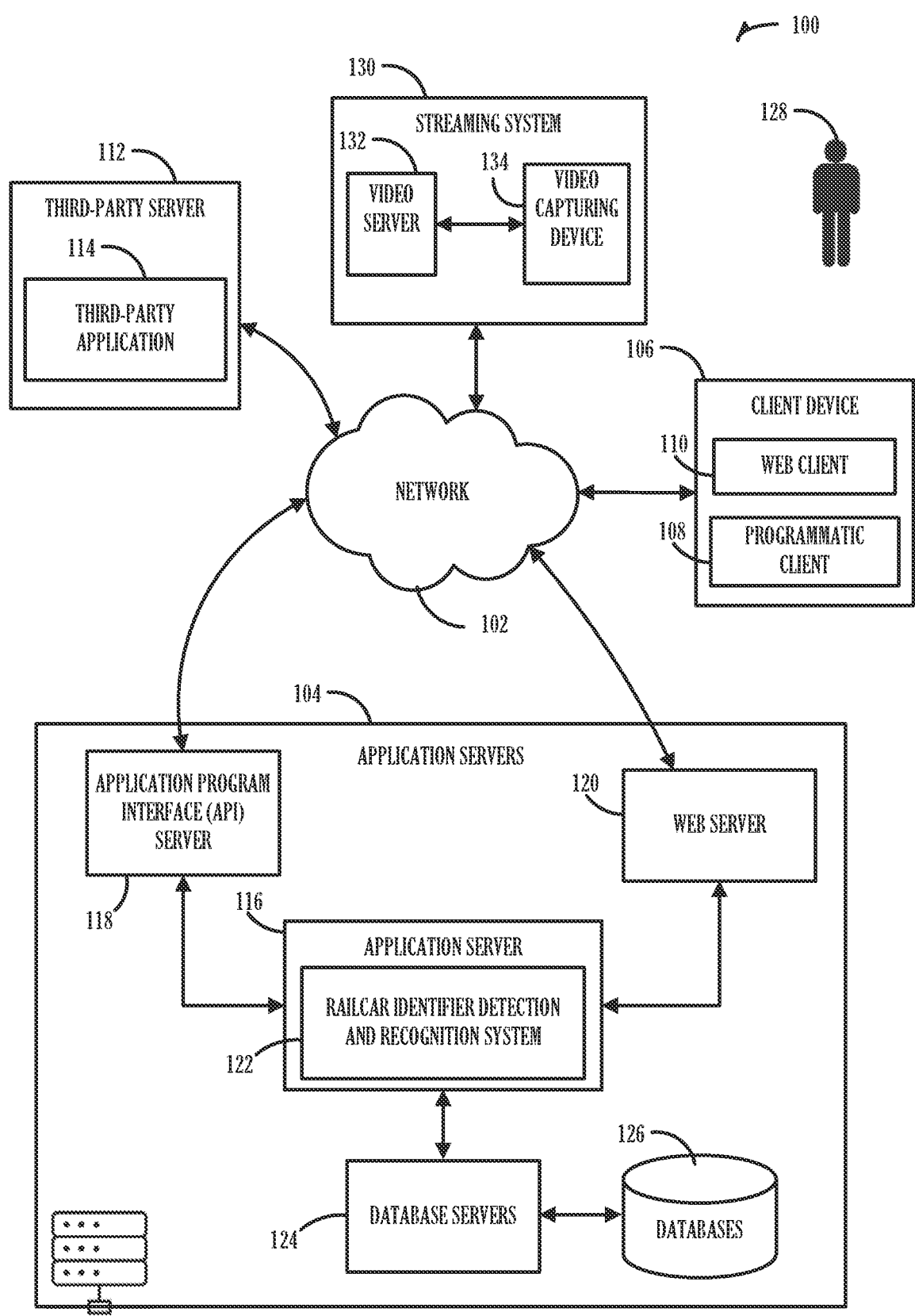
FIG. 1 is a diagram of a network environment in which examples of the present disclosure can be implemented or deployed.

Railcar identifiers are an important tool for ensuring the safe and efficient transportation of goods by rail. Railcar identifiers help rail operators to track individual railcars and ensure they are properly loaded and transported to their intended destination. Railcar identifiers generally include a string of characters or symbols used to identify and track individual railcars as they move through a rail transportation system. An identifier often encodes information about the type of railcar, its owner, or its contents, among other things. In North America, a commonly used convention for railcar identifier codes was developed by the Association of American Railroads, or AAR. An AAR code includes, for example, a two to four-letter code that identifies the owner of the railcar, and a railcar identification number, a unique six-digit number assigned by the car owner that is used to track the individual railcar.

Other types of railcar identifiers include codes that indicate a type of railcar (e.g., boxcar, flatcar, tank car, etc.), a length of a railcar, or a weight, capacity or other characteristic of a railcar. Railcars carrying hazardous materials may have special markings or placards to indicate the nature of their contents. Similar identifier systems or conventions may be applied in other domains, such as for fleets of vehicles, or autonomous mobile objects such as drones or cars.

Railcar identifiers can include a string of characters or symbols that typically have a horizontal orientation, with one or multiple rows. "Character" and "symbol" and "alphanumeric identifier" are used interchangeably herein to refer to discrete portions of a railcar identifier, and can optionally include one or more letters, numbers, pictorial symbols, or other indicia. In examples, a railcar identifier recognition and detection (RIDR) system can be configured to identify railcar identifiers at tilt, rotation, and pan angles. Representation and content of railcar identifiers can be defined by regional standards and vary across regions. Typically, a standard is valid across an agglomeration of countries in the same region and united by a standard of a railway system. Examples of railcar identifiers can occupy widths values of 50-60 pixels (minimum 5% of frame width) and 140-200 pixels (10-15%). However, these sizes and dimensions are a single example, and the size and dimension requirements of the identifiers can vary. For example, some North American railways can require railcar identifiers representation with at least 50-60 pixels or a maximum of 400-500 pixels (30-40% of frame width). Typically, the acceptable values of a height of a railcar identifier can depend on the limits set on the width of the railcar identifier. For example, the height can depend on the width of individual characters, symbols, other indicia, or the like, or the height requirements can depend on the width of the entirety of the railcar identifier.

There is a need for railcar identifier methods and systems with improved accuracy, such as in complex environments or railcar networks, in inclement weather, or under other conditions that make character recognition difficult or impossible for previous systems. The present railcar identifier detection and recognition methods and systems can be configured to generate correct identification results even when one or more portions of a railcar identifier are damaged or missing or obscured. In some examples, the present railcar identifier detection and recognition methods and systems provide smooth object-recognition output on less powerful hardware, such as edge devices and small computers that lack graphic processing modules (GPUs), to save computational resources and electricity costs. The present railcar identifier detection and recognition systems and methods are discussed in more detail below with reference to FIGS. 1-18.

FIG. 1 is a diagram of a network environment 100 in which examples of the present disclosure can be implemented or deployed.

One or more application servers 104 can provide server-side functionality via a network 102 to a networked user device (as a client device 106 of the user 128) and a streaming system 130. A web client 110 (e.g., a browser) and a programmatic client 108 (e.g., an "app") can be hosted and executed on the client device 106. The client device 106 can communicate with a streaming system 130 and application servers 104 via the network 102 or via other wireless or wired means. The streaming system 130 can include a video server 132 and video capturing devices 134. The video capturing devices 134 can generate image data or video data and can provide the image data or the video data to the video server 132. The image data, for example, can be stored in grayscale, black and white, or any other color configuration, and in any suitable resolution.

An Application Program Interface (API) server 118 and a web server 120 can provide respective programmatic and web interfaces to application servers 104. A specific application server 116 can host a railcar identifier detection and recognition system 122 that can operate with the application server 116. In one example, the railcar identifier detection and recognition system 122 receives video or image data from the streaming system 130, detects railcar identifiers in the images or video frames from the streaming system 130, and recognizes the characters, symbols, other indicia, or the like, in the detected railcar identifiers. The operations performed by the railcar identifier detection and recognition system 122 can additionally or alternatively be performed or distributed to another server, such as a third-party server 112. For example, the detection of railcar identifiers can be performed at the railcar identifier detection and recognition system 122, and the recognition of railcar identifiers can be performed at the third-party server 112.

The web client 110 communicates with the railcar identifier detection and recognition system 122 via the web interface supported by the web server 120. Similarly, the programmatic client 108 can communicate with the railcar identifier detection and recognition system 122 via the programmatic interface provided by the Application Program Interface (API) server 118. For example, the third-party application 114 can be an application to support the railcar identifier detection and recognition system 122 or mine the data from the railcar identifier detection and recognition system 122. The third-party application 114 can access location information, registration information, and other information related to railcars with identified railcar identifiers. The application server 116 can be communicatively coupled to database servers 124 that helps with access to an information storage repository or databases 126. In an example, the databases 126 include storage devices that store information to be published or processed by the railcar identifier detection and recognition system 122.

Figure 2:
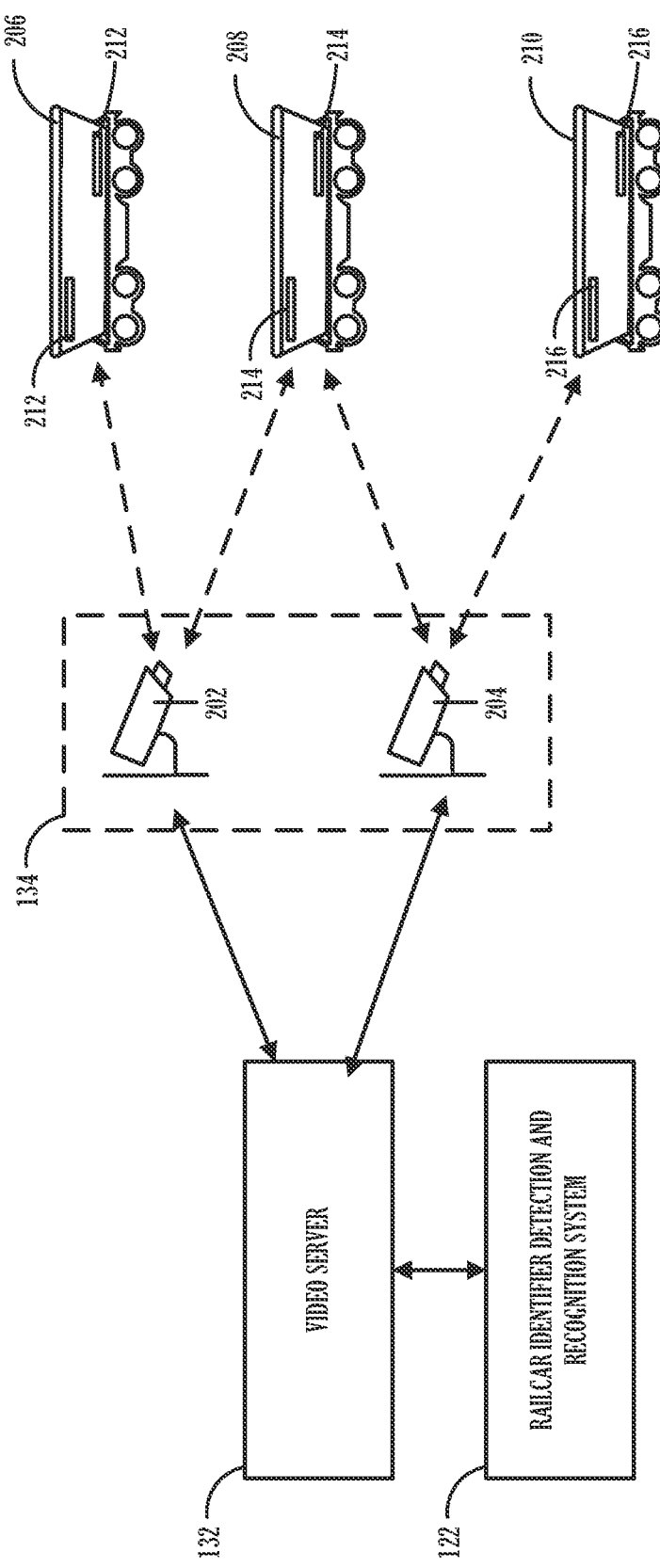
FIG. 2 is a diagram of a system for capturing and recognizing railcar identifiers, according to an example of the present disclosure.

FIG. 2 illustrates an example operation of a system for capturing and recognizing railcar identifiers in accordance with at least one example of the present disclosure. Video capturing devices 134 can include a first camera 202 and a second camera 204 that can generate image data or video data of the railcars 206, 208, 210, and their corresponding respective railcar identifiers 212, 214, and 216. The video capturing devices 134 can be installed at multiple respective locations. Examples of locations include, but are not limited to, bridges, junctions, crossovers, service stations, yards, subway or light rail stations, tram stops, or any area along the track of a train, light rail, or other vehicle transport system. Examples of the video capturing devices 134 include, but are not limited to, Closed-Circuit Television (CCTVs) cameras, High Definition (ND) cameras, non-RD cameras, handheld cameras, traffic cameras, police car cameras, cameras on unmanned aerial vehicles (UAVs) or any other video or image capturing modules.

In an example, a video server 132 can receive images or video footage from the video capturing devices 134 and can transmit the associated data to the railcar identifier detection and recognition system 122. A video or image archive (not shown) can include a data storage for a video or image archive configured to store pre-recorded or archived videos or images. The video or image archive can include a plurality of local databases or remote databases, such as can be centralized or distributed. In another example, the video or image archive can store data using a cloud-based scheme. Like the video server 132, the video or image archive can transmit data to the railcar identifier detection and recognition system 122.

In one example, the video server 132 can communicate the image data or the video data to the railcar identifier detection and recognition system 122 for further processing. In another example, the detection and recognition of the railcar identifiers can be performed at either or both of the railcar identifier detection and recognition system 122 and the video server 132.

In another example, the railcar identifier detection and recognition system 122 can be part of at least one of a surveillance system, a security system, a railcar monitoring system, a yard security system, and a service station, among others. The railcar identifier detection and recognition system 122 can be configured to receive data from at least one of the video server 132, the video or image archive, or the client device 106. The data can be in form of one or more video streams or one or more images or image frames. In some examples, the railcar identifier detection and recognition system 122 can convert a video stream into a plurality of static images or frames. The railcar identifier detection and recognition system 122 can process the one or more received images (or static image frames of videos) and execute a railcar identifier detection algorithm. The detection algorithm can analyze the one or more images, and one or more regions containing railcar identifiers can be detected. For each railcar identifier, the railcar identifier detection and recognition system 122 can recognize the characters, symbols, or other indicia that make up the railcar identifier.

The video capturing devices 134 and the railcar identifier detection and recognition system 122 can optionally be integrated into a single device. For example, the single device can be a portable smartphone having a built-in camera and a display or an integrated railcar identifier detection and recognition device. The railcar identifier detection and recognition system 122 can include or use custom RIDR recognition server software to provide real-time railcar identifier detection and recognition for all cameras on a network.

In another example, the railcar identifier detection and recognition system 122 can be a processing device that does not include a GPU and includes limited CPU capabilities to run railcar identifier detection and recognition processes. The railcar identifier detection and recognition system 122 is described in more detail herein.

FIG. 3 is a diagram illustrating a method 300 of detecting a railcar identifier, according to at least one example of the present disclosure. The method 300 includes operations that can include or use a railcar identification processor, such as comprising the railroad identifier recognition and detection (RIDR) system (e.g., the railcar identifier detection and recognition system 122 from FIG. 1), to operate in various stages, such as a data input stage, a recognition stage, and an output stage. In examples, the method 300 can include operations 310-330.

At operation 310, the method 300 can include the railcar identifier detection and recognition system receiving railcar image information, such as at a data input stage of the railcar identification processor. For example, operation 310 can include receiving at least an image portion that contains, or can be likely to contain, a railcar identifier for a first railcar.

At operation 320, the method 300 can include analyzing the railcar image information to identify characters of the railcar identifier for the first railcar, such as at the recognition stage of the railcar identification processor. The operation 320 can include using various algorithms. For example, analyzing the railcar image information can include or use two or more of a confidence algorithm, a result frequency algorithm, and a per-character algorithm. In another example, analyzing the railcar image information can include using one or more of the confidence algorithm, the result frequency algorithm, and the per-character algorithm.

Figure 18:
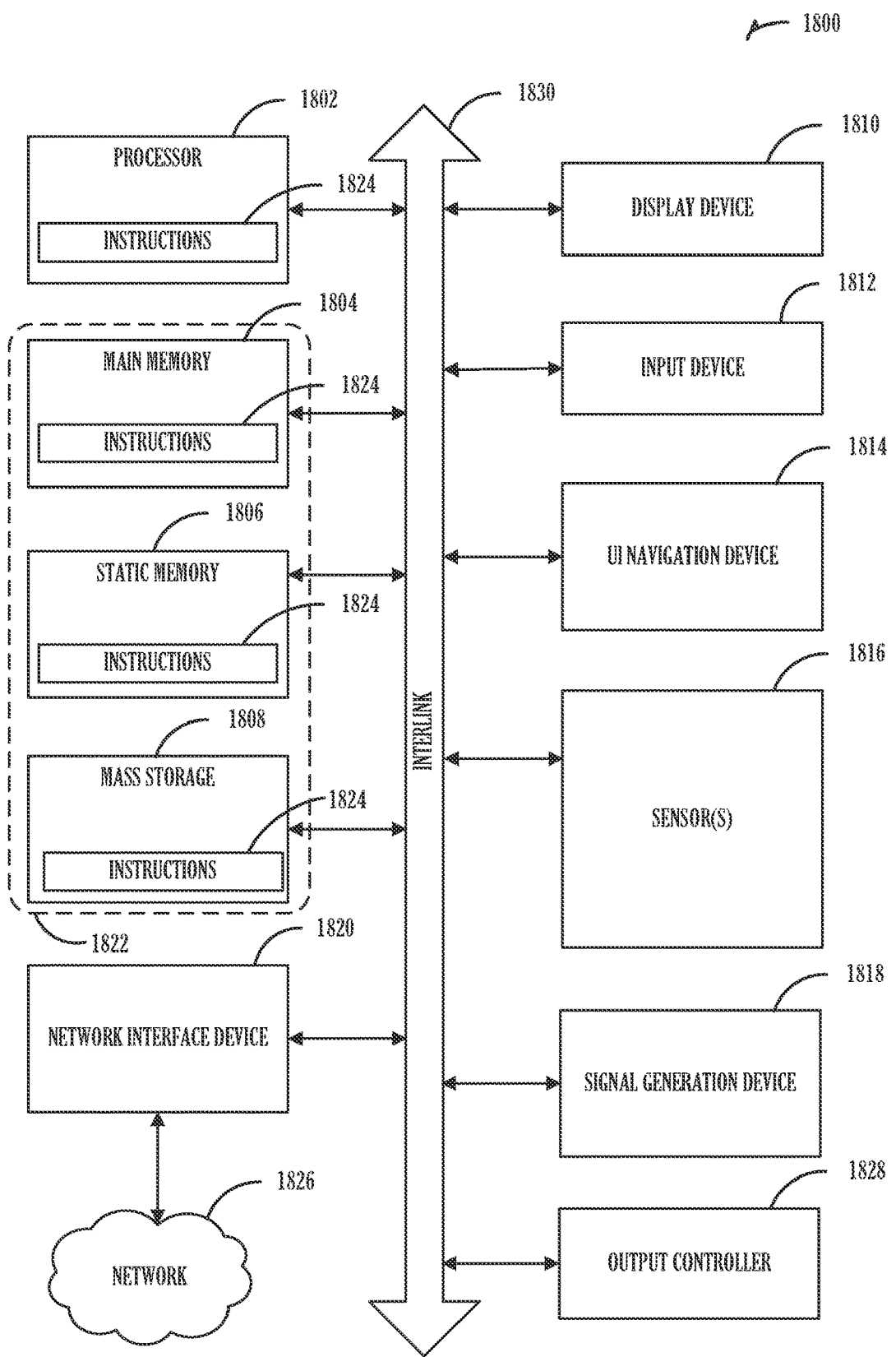
FIG. 18 is a block diagram illustrating an example of a machine upon which one or more examples can be implemented.

In examples, machine-readable instructions for performing the confidence algorithm, the result frequency algorithm, or the per-character algorithm can be stored on one or more databases 126 (e.g., comprising the instructions 1824 on the readable medium 1822 in the example of FIG. 18). In an example, the confidence algorithm can be configured to receive the railcar image information and provide a first character recognition result with a confidence score that indicates a likelihood that the first character recognition result is correct. The result frequency algorithm can be configured to receive multiple preliminary recognition results associated with respective images of, e.g., the first railcar, and provide a result frequency output based on a most-popular result among the multiple preliminary recognition results. The per-character algorithm can be configured to receive the railcar image information and provide a respective recognition result and a respective confidence indicator for each of multiple characters (symbols, other indicia, etc.) in the first railcar identifier.

At operation 330, the method 300 can include providing a first recognition result, such as in an output stage of the railcar identification processor. The operation 330 can include information about the identified characters of the railcar identifier for the first railcar. The method 300 and operations 310-330 will be discussed in more detail herein.

Figure 4:
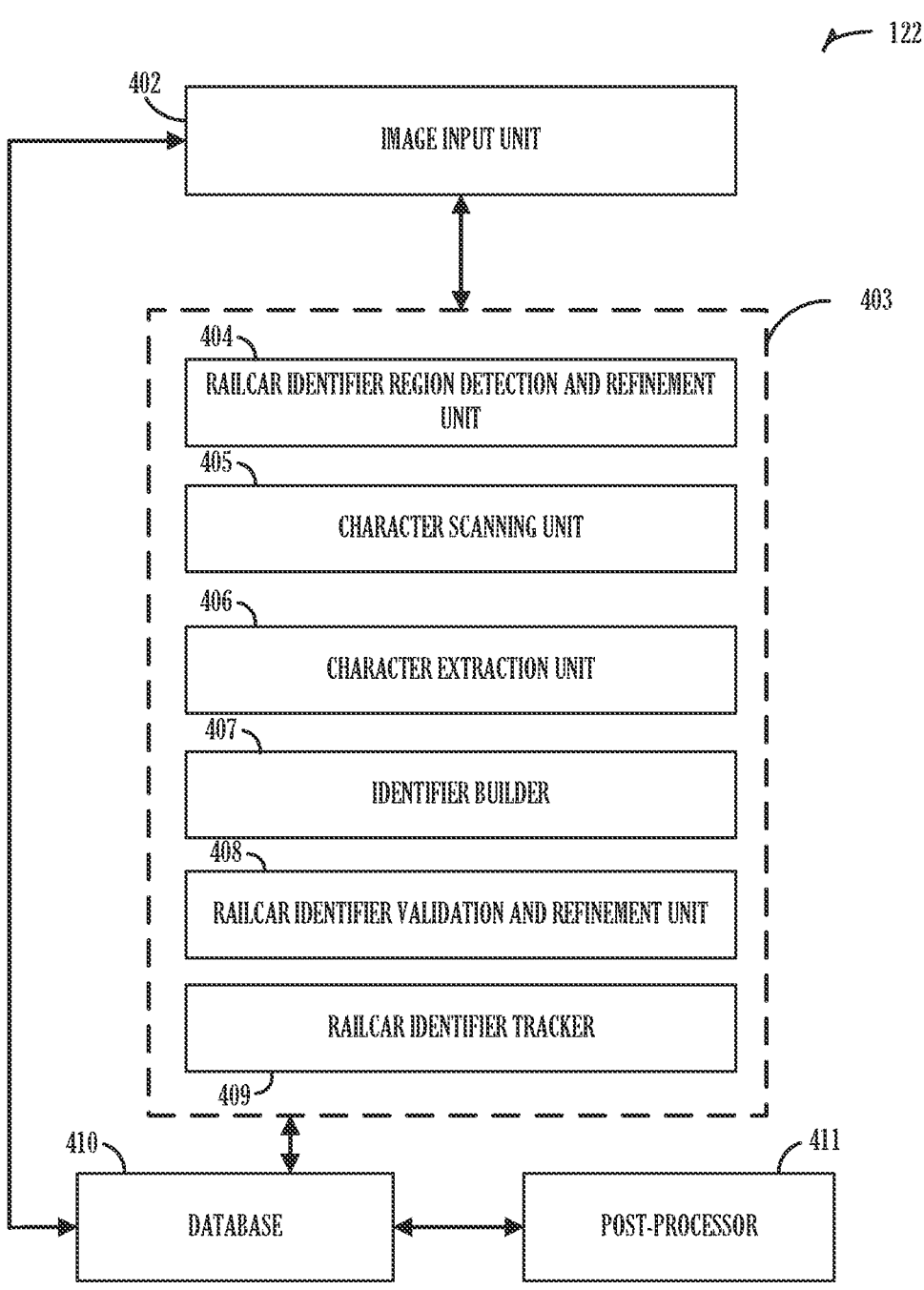
FIG. 4 is a schematic diagram illustrating a railcar identifier detection and recognition system, according to an example of the present disclosure.

FIG. 4 is a schematic diagram illustrating the railcar identifier detection and recognition system 122, according to at least one example of the present disclosure. The railcar identifier detection and recognition system 122 can be configured to prepare or use reference data for railcar identifiers. In an example, the railcar identifier detection and recognition system 122 can include a railcar identifier detection module and a railcar identifier recognition module. The modules can be implemented, for example, using various systems or methods, such as can include or use convolutional neural networks as described in U.S. Pat. No. 11,030, 466 titled "LICENSE PLATE DETECTION AND RECOGNITION SYSTEM," which is herein incorporated by reference in its entirety.

As shown in FIG. 4, the railcar identifier detection and recognition system 122 can include an image input unit 402. The image input unit 402 can be coupled to various functional or computational units 403, such as can comprise purpose-built circuitry or other general purpose processor circuitry programmed to perform particular algorithms. The computational units 403 can include a railcar identifier region detection and refinement unit 404, a character scanning unit 405, a character extraction unit 406, an identifier builder 407, a railcar identifier validation and refinement unit 408, and a railcar identifier tracker 409. In the example of FIG. 4, the railcar identifier detection and recognition system 122 can include a database 410 and a post-processor 411.

The image input unit 402 can be configured to receive one or more videos or images from the video server 132 (FIG. 1). The received videos or images can include information about, or a representation of, at least a portion of an outside of a particular railcar that can include an identifier of the particular railcar. The computational units 403 can collect and process the images from the image input unit 402 such that the rest of the railcar identifier detection and recognition system 122 can use any data or information that the computational units 403 extracts from the images.

In an example, the computational units 403 can define identification regions in an input image where presence of railcar identifiers is most likely or most probable. Each identification region of the identification regions can include a recognized railcar identifier or a portion thereof. The recognized railcar identifier can include, for example, a string of characters used to identify a railcar.

The computational units 403 can use a fine-tuning algorithm to correct, or improve the accuracy of, the recognized railcar identifier within each of the railcar identification regions. In an example, the computational units 403 can be configured to rotate each of the potential railcar identifiers within each of the railcar identification regions with an alignment algorithm to align the potential railcar identifier of each railcar identification region to a directionally aligned (e.g., horizontal or vertical) position. The computational units 403 can be configured to recognize a sequence of characters of the potential railcar identifier of each of the railcar identification regions using an alphanumeric identifier algorithm. The image input unit 402 can be configured to transmit, to a controller, the sequence of alphanumeric characters along with a recognition confidence value. In examples, the recognition confidence value can indicate an confidence of correct railcar identifier recognition.

In another example, the computational units 403 can be configured to train a convolutional neural network to process images of the railcars that include a recognized railcar identifier. The computational units 403 can also communicate with or use a pre-trained convolutional neural network to process images of the railcars that include a recognized railcar identifier. For example, the computational units 403 can be configured to detect identification regions in an input image, and each identification region of the identification regions includes a potential railcar identifier or a portion thereof. The computational units 403 can initialize a fine-tuning algorithm to correct the recognized railcar identifier within each of the identification regions. The computational units 403 can rotate each potential railcar identifier with an alignment algorithm to align the potential railcar identifier to a directionally aligned position. The computational units 403 can be configured to recognize a sequence of alphanumeric characters of the potential railcar identifier using an alphanumeric identifier algorithm. The computational units 403 can be configured to transmit, for example to the controller, the sequence of alphanumeric characters along with a recognition confidence value, the recognition confidence value indicative of an accuracy of the recognized railcar identifier.

In an example, the above-mentioned functions of the computational units 403 can be performed at the image input unit 402 or can be performed using a respective one of the computational units 403 coupled to the image input unit 402. For example, a location detection module can be configured to perform railcar identifier region detection and region refinement, and can be used to prepare ground truth data that can be used to train a CNN or other algorithm to detect a particular location of a railcar identifier on a railcar in an image of a railcar. For example, the location detection module can include a railcar identifier region detection and refinement unit 404 configured to detect a region within an image that can include at least a portion of the railcar identifier. The railcar identifier region detection and refinement unit 404 can be trained with images known to include railcar identifiers and can detect regions of an image that include, or are likely to include, at least a portion of a railcar identifier. The railcar identifier region detection and refinement unit 404 can help reduce the processing required of the railcar identifier detection and recognition system 122 by limiting the processing to the region(s) of the images that include, or that are most likely to include, at least a portion of the railcar identifier.

The character scanning unit 405 can scan characters of the railcar identifier located within the regions of the images detected with the railcar identifier region detection and refinement unit 404. In examples, the character scanning unit 405 can detect specific character features such as fonts or styles of railcar identifier characters. In another example, the character scanning unit 405 can be configured to detect a font or symbol type and scan the characters of the railcar identifier within the region of the images detected by the railcar identifier region detection and refinement unit 404.

The character extraction unit 406 can be configured to extract the characters found using the character scanning unit 405. In examples, the extracted characters can be found within the regions of the images detected by the railcar identifier region detection and refinement unit 404 that can include at least a portion of the railcar identifier. The character extraction unit 406 can be trained to extract the characters of the railcar identifier used in the geographic region within which the railcar identifier detection and recognition system 122 is located. In another example, the character extraction unit 406 can automatically detect any font or symbol, which can enable the character extraction unit 406 to extract the characters of any text, symbol, or other indicia within the regions of the images detected by the railcar identifier region detection and refinement unit 404.

In an example, a convolutional neural network can be configured to implement the character scanning unit 405 and the character extraction unit 406. The convolutional neural network can be configured to identify the bounded portion of the image corresponding to the railcar identifier and apply the character recognition process to identify the values for symbols or characters of the railcar identifier.

The identifier builder 407 can build a representative railcar identifier from the characters extracted by the character extraction unit 406. In one example, the railcar identifier detection and recognition system 122 can store the representative identifier constructed by the identifier builder 407. In another example, the railcar identifier detection and recognition system 122 can send the representative identifier constructed by the identifier builder 407 to any other system, module, or component of the network environment 100. In an example, the identifier builder 407 uses a template to build the representative railcar identifier, and the template is based on one or more of a geographic region, a railway convention, or other source of rules or regulations that defines valid elements of the identifier.

The railcar identifier validation and refinement unit 408 can be configured to confirm the railcar identifier and adjust or refine the railcar identifier. For example, the railcar identifier validation and refinement unit 408 can use multiple operations to verify the representative railcar identifier found by the identifier builder 407. Operations that the railcar identifier validation and refinement unit 408 can use are discussed herein.

The railcar identifier tracker 409 can be configured to track confirmed or validated railcar identifiers. The railcar identifier tracker 409 can receive the confirmed or validated railcar identifiers and can track all information (e.g., location information, load information, weight information, route information, maintenance logs, or the like) for each of the confirmed or validated railcar identifiers. For example, the railcar identifier tracker 409 can rename, or name, multiple versions of each of the railcar identifiers. For example, the railcar identifier tracker 409 can create a new version of the railcar identifier for each leg of a trip, or every time the contents of the railcar change. In another example, the system can generate new versions of the railcar identifiers at a pre-determined time threshold, which can help maintain history of the railcar identifiers as their corresponding railcars move through the system. Thus, each version of the railcar identifiers can be saved in the database 410. The post-processor 411 can then access each version of the railcar identifiers saved on the database 410 for further processing, analysis, or machine learning of one or more components of the network environment 100.

When the railcar identifier detection and recognition system processes a sequence or time-series of images, the railcar identifier tracker 409 can improve results by accumulating the previous observations and let end-users benefit from handling with railcar identifiers via their unique increasing numeric identifiers created and maintained automatically by a tracking algorithm. So, the railcar identifier tracker 409 can help reduce computing capacity when the railcar identifier detection and recognition system is finding a railcar identifier that the system has found.

Check digits can be used for error detection in railcar identifiers, for example to ensure that a particular identifier is identified correctly. A check digit can include one or more symbols that comprise a portion of the railcar identifier and that is calculated based on other symbols in the identifier.

The check digit is designed to be easily calculated and verified, so that if there is an error in the identifier, it can be quickly detected and corrected. For example, an AAR reporting mark and car number may be combined to create a unique railcar identifier. To add a check digit to this identifier, a mathematical formula is applied to the letters and numbers in the identifier, and the result is a single-digit number that is added to the end of the identifier. When the railcar is tracked, such as using the railcar identifier tracker 409, the check digit can be used to quickly verify that a machine-identified railcar identifier was correctly recognized. Check digit formats and formulae can be specific to different geographic areas, rail lines, or other groups.

In some examples, a railcar identifier detection and recognition system can be configured to receive as an input information about the geographic area in which the system is used, for example, to ensure that particular check digit rules are applied. If a check digit is not required, then the check digit identifier validation step can be omitted. Some railcar identifier detection and recognition systems can also provide information about the start of the observation of a new railcar, which can help prevent the mixing data from different railcars.

Figure 5:
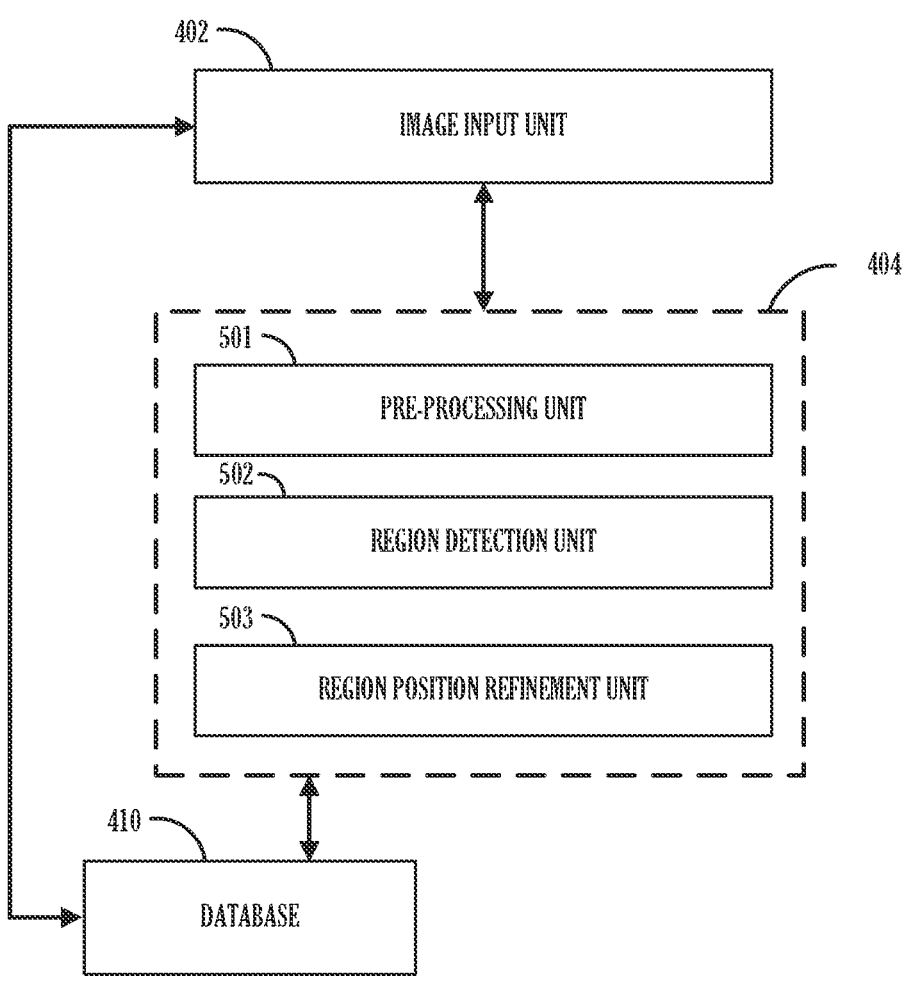
FIG. 5 is a schematic diagram illustrating a railcar region detection refinement unit, according to an example of the present disclosure.

FIG. 5 is a schematic diagram illustrating the railcar identifier region detection and refinement unit 404, according to at least one example of the present disclosure. Each of the sub-components of the railcar identifier detection and recognition system 122, for example the railcar identifier region detection and refinement unit 404, the character scanning unit 405, the character extraction unit 406, the identifier builder 407, the railcar identifier validation and refinement unit 408, or the railcar identifier tracker 409, can include different processing sub-modules. In examples, the exact set of sub-modules can be adjusted to match the requirements of the components of the network environment 100 (FIG. 1). For example, as shown in FIG. 5, the railcar identifier region detection and refinement unit 404 can include a pre-processing unit 501, a region detection unit 502, and a region position refinement unit 503.

The pre-processing unit 501 can be configured to prepare one or more images for processing by the region detection unit 502 and the region position refinement unit 503. For example, the pre-processing unit 501 can use a convolutional neural network or other processor or controller to determine an image that has the best image of a railcar identifier. In another example, the pre-processing unit can prepare the image for use by the system, for example, by the region detection unit 502 and the region position refinement unit 503. The pre-processing unit 501 can resize, crop, alter a color saturation, or edit the image in any other way, which can help the region detection unit 502 and the region position refinement unit 503 more accurately process the image.

The region detection unit 502 can be configured to identify one or more regions within the one or more images likely to have the railcar identifier. The region position refinement unit 503 can be configured to improve, or refine, the regions detected by the region detection unit 502. In examples, any of the pre-processing unit 501, the region detection unit 502, or the region position refinement unit 503 of the railcar identifier region detection and refinement unit 404 can use one or more processing techniques to improve the results. For example, the region detection unit 502 can use the available computer vision, machine learning, or deep learning approaches to improve accuracy of the one or more regions detected in one or more images. For example, the region detection unit 502 can iteratively apply a detection module in smaller or different look up windows with an adjusted set of detection parameters around the original bounding box, which can result in more accurate bounding boxes. The region detection unit 502 can use the region position refinement unit 503 to tweak preliminary reported bounding box positions to be tightly correlated to, or adjacent to, edges of characters that comprise the railcar identifier. In examples, the improved result of processing can be saved into the database 410.

In examples, when the region detection unit 502 determines a window extended around the detected position of a railcar identifier, the region position refinement unit 503 can, for example, using the bounding box position fine-tuner module, get input of fixed size, determine a resolution of that module, and revert the data to the original resolution. The region position refinement unit 503 can use the input of fixed size and resolution to help adjust coordinates of the bounding boxes around a railcar identifier. The region position refinement unit 503 can position the detected railcar identifier in a center of that cropped image. As result of processing, the region position refinement unit 503 can return coordinates of the left-top, and right-bottom corners of an adjusted position of a railcar identifier, which can be stored in one or more databases for future recollection. In another example, the unit can return coordinates of any one or more of the corners for a bounding box that surrounds all or a portion of a railcar identifier.

Figure 6:
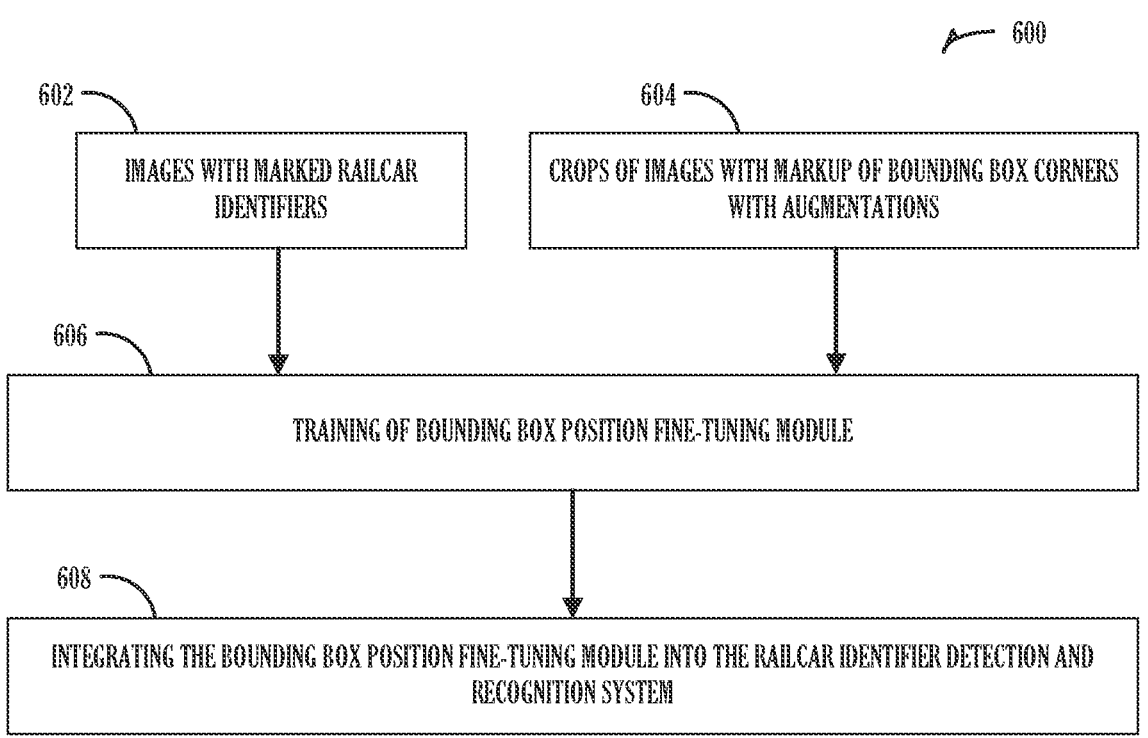
FIG. 6 is a diagram illustrating a method of training a machine learning model, according to an example of the present disclosure.

FIG. 6 is a diagram illustrating a method 600 of training a fine-tuning module, according to an example of the present disclosure. Ground truth or training data, which is also discussed herein as reference data, can be provided to the fine-tuning module as images with pre-defined bounding boxes or markups with coordinates of bounding box corners (e.g., as developed for training of a detection module). After the reference data is prepared, a position fine-tuner module can be trained to return revised coordinates of bounding box corners with desired accuracy. For example, the method 600 can be one example of a method or technique that can help train and integrate a fine-tuner module into the railcar identifier detection and recognition system 122 of the network environment 100 (see, e.g., FIG. 1). The method 600 can include operations 602-608.

At operation 602, the method 600 can include receiving images with marked or known railcar identifiers. In examples, the received images can be images that are manually confirmed or otherwise known to include a railcar identifier. In another example, the network environment 100 can be configured to send images of railcars or railcar identifiers for third-party confirmation or checking, and can be configured to receive the images where the railcar identifier has been confirmed. Thus, the network environment 100 can continually train the components or subcomponents of the network environment 100.

At operation 604, the method 600 can include receiving cropped images, corresponding to the received images from operation 602, with or without bounding box corner information corresponding to the cropped portions of the images. In an example, the cropped images received at 604 can be augmented (e.g., pre-processed) using one or more filters. The system can be configured to use the images received in operation 602, and the corresponding cropped images received in operation 604, to learn how to find the same or similar railcar identifiers in other images.

At operation 606, the method 600 can include training the fine-tuning module to more accurately position a bounding box. For example, the fine-tuning module can run one or more instructions or algorithms that can use the reference data received at operations 602 and 604 to find and adjust the bounding box in one or more other images.

At operation 608, the method 600 can include integrating the fine-tuning machine learning module into the railcar identifier detection and recognition system (e.g., the railcar identifier detection and recognition system 122). In examples, the fine-tuning module can improve the bounding boxes as they are found during the identifying of the railcar identifier in the one or more images likely to have the railcar identifier.

Figure 7:
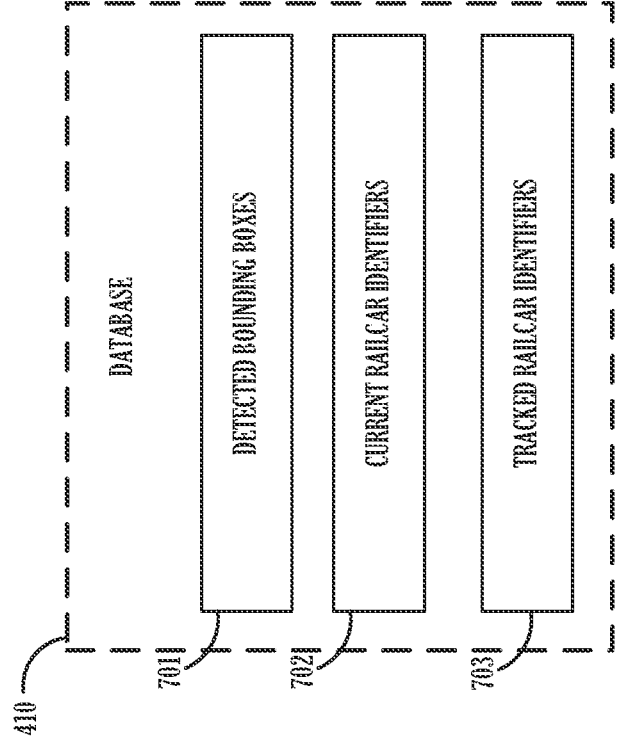
FIG. 7 is a schematic diagram illustrating a database structure, according to an example of the present disclosure.

FIG. 7 is a schematic diagram illustrating a database structure of the database 410, according to at least one example of the present disclosure. The database 410 can include many segments, partitions, or portions of the database 410 that can sort or separate the different data captured or used by the network environment 100. For example, the database 410 can include information about one or more of detected bounding boxes 701, current railcar identifiers 702, and tracked railcar identifiers 703.

The detected bounding boxes 701 can include information about bounding boxes detected by the railcar identifier detection and recognition system 122, such as box corners or coordinate information relative to specific images or frames. For example, the detected bounding boxes 701 can include every iteration of the bounding boxes found during any operation of the railcar identifier detection and recognition system 122. Each of the found bounding boxes can be saved with a unique identifier such that any system of the network environment 100 (FIG. 1) can recall the saved bounding box for future use or analysis.

The current railcar identifiers 702 can include the railcar identifiers currently active in the network of the network environment 100. For example, the railcar identifiers found and in-use within the network environment 100 can be stored as the current railcar identifiers 702. If a particular railcar is no longer used in the network, then its corresponding railcar identifier can be removed from the current railcar identifiers 702 such that the current railcar identifiers 702 only has active railcar identifiers.

The tracked railcar identifiers 703 can include all of the railcar identifiers identified by or otherwise known to the railcar identifier detection and recognition system 122. For example, the railcar identifier detection and recognition system 122 can track railcar identifiers throughout the rail network. Other data or metadata can be included with the tracked railcar IDs. For example, the tracked railcar identifiers 703 can include geographic, timing, loading, or any other pertinent information that can be tracked with the railcar ID. As discussed herein, the RIDR system can include multiple cameras or multiple image sources. As such, the database 410 can store the images and other data from each of the image sources separately such that images and data from each image source can be analyzed separately.

FIG. 8 is a diagram illustrating a method 800 that can include adjusting a representative of a railcar identifier, according to an example of the present disclosure.

At operation 810, the method 800 can optionally include detecting one or more identification regions in an input image. Each identification region of the identification regions can include a potential railcar identifier. The potential railcar identifier can be a known string of characters to identify a railcar.

At operation 820, the method 800 can include initializing a fine-tuning algorithm to correct the potential railcar identifier within each identification region. For example, the fine-tuning algorithm can be the fine-tuning module as discussed herein with reference to FIG. 6. The fine-tuning algorithm can fine-tune the edges of a bounding box, such as to improve the detection and recognition of the railcar identifier with the railcar identifier detection and recognition system 122.

At operation 830, the method 800 can include rotating each of the potential railcar identifiers within each railcar identification region with an alignment algorithm to align the potential railcar identifier of each railcar identification region to a directionally-aligned (e.g., horizontally-aligned) state. At operation 840, the method 800 can include recognizing a sequence of characters of the potential railcar identifier of each of the railcar identification regions using an alphanumeric identifier algorithm.

At operation 850, the method 800 can include transmitting, to a controller, the sequence of alphanumeric characters along with a recognition confidence value. The recognition confidence value can quantitatively indicate confidence that a detected and recognized potential railcar identifier is a real railcar identifier. In some examples, the fine-tuning algorithm adjusts coordinates of the bounded portion around the potential railcar identifier. The fine-tuning algorithm can optimize the coordinates of the bounded portion around the potential railcar identifier, for example, to reduce noise in the input image signal and thereby increase the recognition confidence value.

FIG. 9 is a diagram illustrating a method 900 of detecting a railcar identifier, according to at least one example of the present disclosure.

At operation 910, the method 900 can include receiving an image captured by an image sensor. For example, the image can be received by processing circuitry of a controller (e.g., the railcar identifier detection and recognition system 122 from FIG. 1). The image can include an outward-facing side portion of a railcar (e.g., of one or more of the railcar 206, railcar 208, or the railcar 210) that can include at least a portion of the railcar identifier (e.g., railcar identifiers 212, railcar identifiers 214, or railcar identifiers 216).

At operation 920, the method 900 can include identifying a bounded portion of the image corresponding to the railcar identifier. In examples, the railcar identifier detection and recognition system can be trained to detect the railcar identifiers and identify a bounded portion of the image around the identifiers within the image received from the image sensor. In another example, the railcar identifier detection and recognition system can identify more than one, for example, many bounding portions of the image that correspond to the railcar identifier or to multiple respective identifiers. For example, an image can include more than one railcar identifier, thus, for example, the railcar identifier detection and recognition system can identify a bounding portion for each of the railcar identifiers within the image.

At operation 930, the method 900 can include applying a character recognition process to identify respective values for characters of the railcar identifier using the bounded portion of the image. In examples, the railcar identifier detection and recognition can use just the bounded portion of the image to reduce an amount of computing power required to find the railcar identifier. Further, the railcar identifier detection and recognition can analyze multiple bounding portions within the image to identify the railcar identifier in any one of the multiple bounding portions.

In some regions, the railcar identifiers can include a check digit to help verify the accuracy of the read railcar identifier. For such examples, the method 900 can include operations 940-970.

Figure 11:
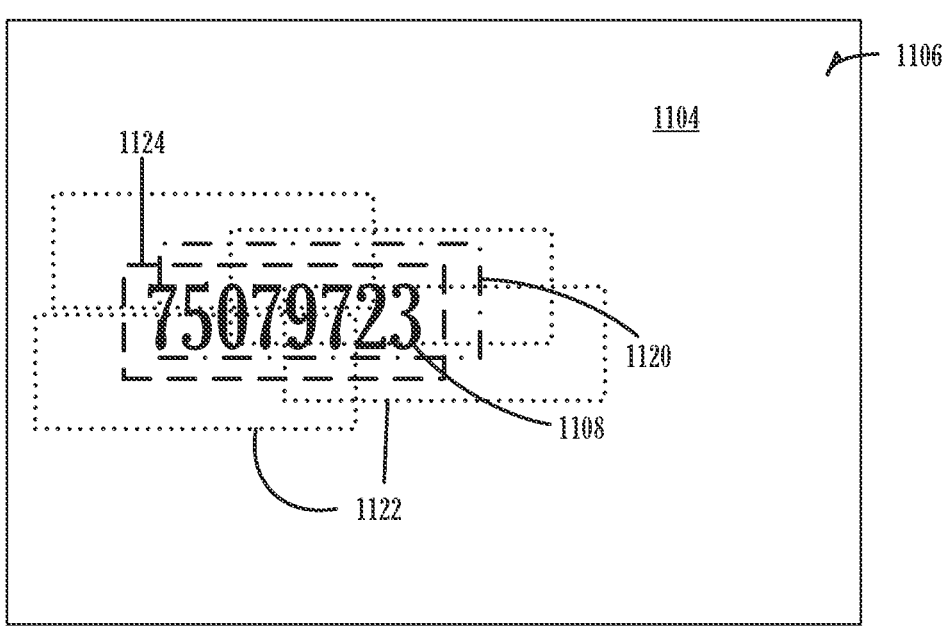
FIG. 11 illustrates an example of adjusting a bounding box, according to an example of the present disclosure.

At operation 940, the method 900 can include computing a check digit using the identified values. The check digit can be computed using a particular method, such as corresponding to the geographic area in which the railcar identifier was observed or recorded. In an example, the check digit can be used by first identifying the constituent symbols or characters of the railcar identifier, then operating on the respective symbols or characters sequentially. An example of a particular check digit representation is shown in FIG. 11.

At operation 950, the method 900 can include comparing the computed check digit to a particular one of the identified values of the railcar identifier, for example, the last or final digit in the identifier. For example, the check digit used in the example of FIG. 11 is 3.

At operation 960, the method 900 can include providing a first railcar identification result and adjusting the bounded portion of the image when the check digit and the particular one of the identified values of the railcar identifier is unequal. As shown in the example of FIG. 11, the bounding portion of the image can be adjusted, and the check digit calculation can be rerun to verify the read railcar identifier.

At 970, the method can include providing a second railcar identification result when the check digit and the particular one of the identified values of the railcar identifier are equal. Once the railcar identification result and the particular one of the identified values matches, the railcar identifier detection and recognition system can stop analyzing the railcar identifier because the railcar identifier detection and recognition system has likely found the correct railcar identifier.

FIG. 10 is a diagram of a process for identifying a railcar identifier, according to at least one example of the present disclosure. As shown in FIG. 10, the railcar identifier detection and recognition system 122 (FIG. 1) can include a region detection unit 1002 (e.g., the region detection unit 502 (FIG. 5)). As discussed herein, the region detection unit 1002 can find a region, or one or more regions, of one or more images where a railcar identifier is likely contained. The region detection unit 1002 can then transmit the one or more images, and the detected regions to a region position refinement unit (e.g., the region position refinement unit 503 (FIG. 5)) for further processing.

The network environment 100 can also include operation 1004, where the railcar identifier detection and recognition system (e.g., the railcar identifier detection and recognition system 122 (FIG. 1)) can compute or receive recognized railcar identifiers and their respective confidence scores. At operation 1006, the railcar identifier detection and recognition system 122 can determine if the railcar identifiers were found in a region that utilizes the check digit validation. If check digit validation is available, the railcar identifier detection and recognition system 122 can complete operation 1008 to compute check digit to verify the recognized railcar identifier and transmit the recognized identifier to operation 1010. If check digit validation is not available, the recognized railcar identifiers from operation 1004 can be sent to operation 1010.

At operation 1010, the railcar identifier detection and recognition system 122 can store the recognized railcar identifier. At operation 1012, the railcar identifier detection and recognition system 122 can utilize any method discussed herein to determine a best, for example, most likely to be accurate or a highest confidence score. The railcar identifier detection and recognition system 122 can then store the best recognized railcar identifier as a current railcar identifier at operation 1014. For example, the current railcar identifier can be transmitted to the railcar tracker (e.g., the railcar identifier tracker 409 (FIG. 4)). At operation 1016, the 122 can store the current railcar identifier in one or more databases (e.g., the database 410 (FIG. 4)).

FIG. 11 illustrates a pictorial example of adjusting a bounding box to recognize a railcar identifier, according to one or more examples of the present disclosure. An outside portion 1104 of a railcar 1106 (e.g., the railcars 206, 208, or 210 (FIG. 2)) can include a railcar identifier 1108 (e.g., the railcar identifiers 212, 214, or 216), which can be captured in one or more images. The railcar identifier detection and recognition system 122 (FIG. 1) can generate bounding boxes that can determine the identity or content of the railcar identifiers. As shown in FIG. 11, the railcar identifier detection and recognition system 122 can generate an original bounding box 1120, one or more interim bounding boxes 1122, and an ideal bounding box 1124.

The original bounding box 1120 can be a first bounding box generated by the railcar identifier detection and recognition system 122. In examples, the original bounding box 1120 can include at least a portion of the railcar identifier and as discussed above, check digits can be used for error detection in railcar identifiers. Thus, a check digit can be calculated to determine if the original bounding box 1120 accurately contains the railcar identifier. As shown in FIG. 11, the original bounding box 1120 cuts off a portion of a leading digit of the railcar identifier 1108, so the identified railcar identifier within the original bounding box 1120 can be, e.g., 15079723. An example check digit calculation can split the digits and alternatively multiply by two and one, such as:

$$2*1+1*5+2*0+1*7+2*0+1*7+2*9+1*7+2*2=2+5+0+7+1+8+7+4=34$$

To find the check digit, take the next multiple of ten and subtract the above result from that, such as:

$$40-34=6\neq3$$

The calculated check digit (6) does not match the check digit (3) of the railcar identifier 1108. Therefore, the original bounding box 1120 can be deemed to be incorrectly located and can be adjusted.

To improve the original bounding box 1120, the railcar identifier detection and recognition system 122 can iteratively attempt to recognize characters inside one or more other bounding boxes, such as the interim bounding boxes 1122. At each iteration, the railcar identifier detection and recognition system 122 can recompute the check digit to determine whether the railcar identifier was properly bounded and identified. As shown in the example of FIG. 11, the interim bounding box 1122 can be adjusted (e.g., randomly or according to a specified bounding box adjustment algorithm), for example, in any direction, to optimize the bounding box and eventually find the optimal bounding box 1124.

An optimal bounding box 1124 can be determined when the check digit agrees with the pre-determined digit of the reference numeral. For example, as shown here:

$$2*7+1*5+2*0+1*7+2*0+1*7+2*9+1*7+2*2=1+4+5+0+7+1+8+7+4=37$$

such that:

$$40-37=3=3$$

The check digit calculated above thus matches the predetermined check digit of the railcar identifier 1108. In examples, every instance, and the coordinates and position of the bounding boxes on the one or more images, can be stored in a data base (e.g., the database 410 of FIG. 4).

Figure 12:
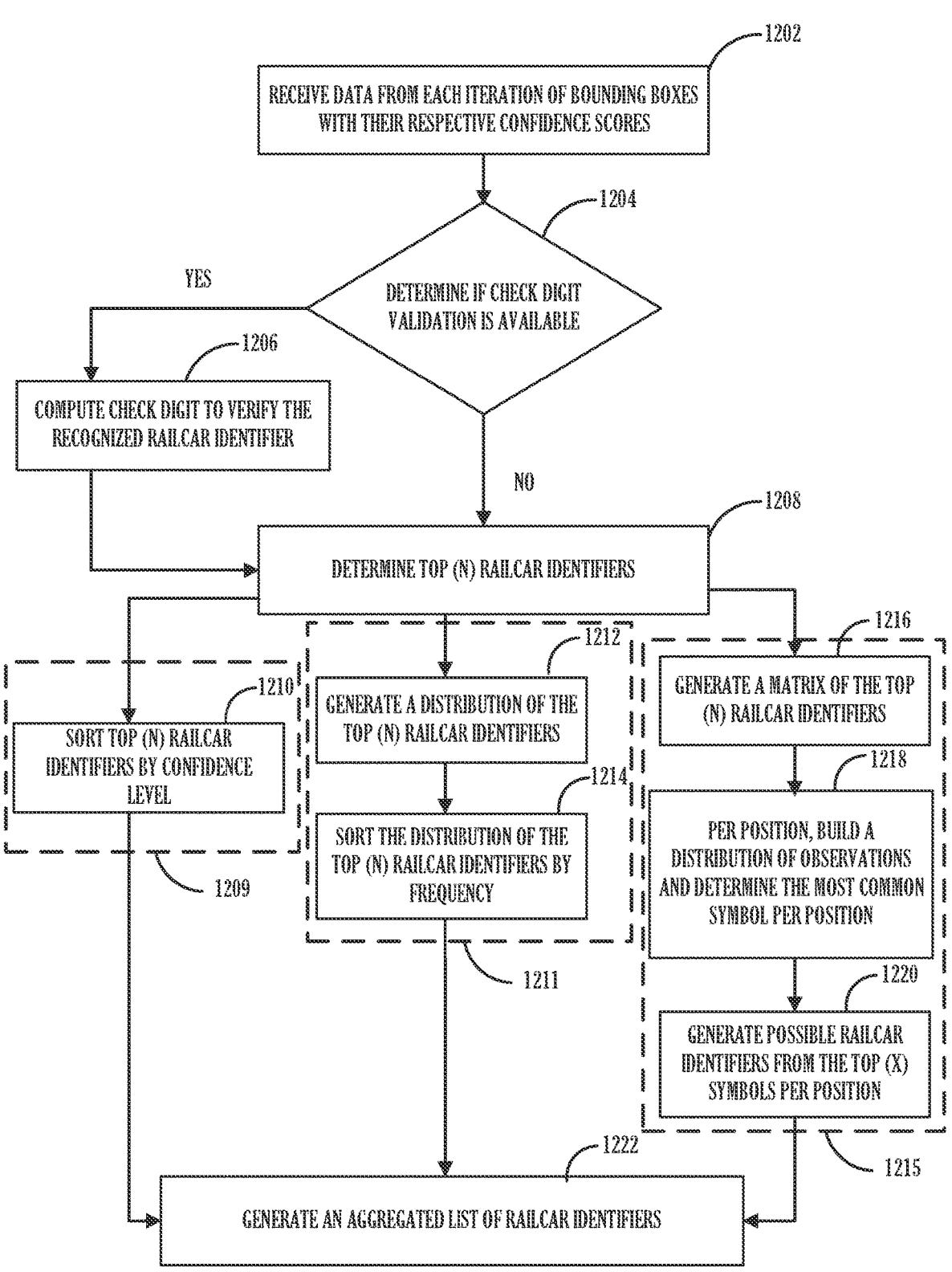
FIG. 12 is a diagram illustrating a method of identifying a railcar identifier, according to an example of the present disclosure.

FIG. 12 is a diagram of a process for identifying a railcar identifier, according to at least one example of the present disclosure. The example in FIG. 12 can be implemented by the components of the network environment 100 (FIG. 1). For example, the railcar identifier detection and recognition system 122 (FIG. 1) can implement each of the operations, in isolation or combined with other components of the network environment 100, while determining a final representative railcar identifier or aggregated list of identifiers. That is, operations 1202-1222 can be completed by the components of the network environment 100.

At operation 1202, the railcar identifier detection and recognition system 122 can receive data from the original bounding box 1120 the interim bounding box(es) 1122, and the optimal bounding box 1124 (FIG. 11). This data can be collected and can be separately stored in one or more databases (e.g., the database 410 (FIG. 4).

At operation 1204, the railcar identifier detection and recognition system 122 can determine if the railcar identifiers are from a region where check digit validation is available. If check digit validation is available, then the railcar identifier detection and recognition system 122 can complete operation 1206, which can include computing a check digit to verify the recognized railcar identifier. Then, at operation 1208, the railcar identifier detection and recognition system 122 can determine a number (N) of railcar identifiers from the verified and recognized railcar identifiers from operation 1206. If check digit validation is not available, the railcar identifier detection and recognition system 122 can skip operation 1206 and can determine the (N) railcar identifiers from the data received at operation 1202.

The railcar identifier detection and recognition system 122 can take the (N) railcar identifiers from operation 1208 and can analyze the railcar identifiers using one or more of a first method 1209, a second method 1211, or a third method 1215.

The first method 1209 includes operation 1210. At operation 1210, the railcar identifier detection and recognition system 122 can sort the (N) railcar identifiers by their respective confidence levels. For example, a confidence level can be determined for, and associated with, each respective one of the (N) railcar identifiers. The confidence level can indicate a likelihood that a particular railcar identifier is true or accurate. In an example, the confidence level can be output from a CNN that is used to identify the characters or symbols of the railcar identifiers. In an example, the confidence level can be provided for each character or symbol of a railcar identifier. Following operation 1210, the sorted railcar identifiers can be transmitted or stored at operation 1222.

The second method 1211 can include operation 1212 and operation 1214. At operation 1212, the railcar identifier detection and recognition system 122 can generate a distribution of the (N) railcar identifiers. That is, the system can determine a frequency of occurrence of each of multiple different identifiers in the group of (N) identifiers. Then, at operation 1214, the railcar identifier detection and recognition system 122 can sort the distribution of the (N) railcar identifiers by frequency. Accordingly if a particular identifier appears most often in the group of (N) identifiers determined at operation 1208, then that particular identifier can be returned from the second method 1211. In another example, the railcar identifier detection and recognition system 122 can sort the railcar identifiers in any other way (e.g., using a confidence score or other way). Then the sorted distribution of the top (N) railcar identifiers can be transmitted or stored at operation 1222.

The third method 1215 can include operation 1216, operation 1218, and operation 1220. At operation 1216, the railcar identifier detection and recognition system 122 can generate a matrix of the (N) railcar identifiers. In examples, each component symbol of the (N) railcar identifiers can have a unique position in the matrix. For example, each matrix row can correspond to a different respective railcar identifier, and each matrix column can correspond to a different symbol position. At operation 1218, the railcar identifier detection and recognition system 122 can build or determine a distribution per each of the character positions. For example, the distribution can be a distribution of observations, which can determine the most common symbol per character position of the railcar identifiers. That is, a most common symbol can be identified in each column of the matrix. At operation 1220, the railcar identifier detection and recognition system 122 can generate possible railcar identifiers from the top (X) symbols per symbol position. For example, the railcar identifier detection and recognition system 122 can take the top one, two, three, or more symbols for each of the symbol or character positions and generate every possible railcar identifier combination resulting from the top one, two, three, or more symbols from each of the positions.

For example, per position (or column of the matrix), the railcar identifier detection and recognition system 122 can build a distribution of symbol observations for each symbol. A selected symbol for each position can be the most popular symbol, letter, number, or the like in each of the columns. A new combination of railcar identifiers can be created using the top one or two symbols for position, computing a confidence of the combined railcar identifiers as an average confidence of all symbols, filtered to combine only those with a valid check digit, and sort the resulted railcar identifiers by confidence to have the most likely railcar identifiers appear first. The generated railcar identifiers, if a check digit validation is available, can be verified, so that combinations built based on the most common observations can be transmitted or stored at operation 1222. In the case that the generated identifiers fail check digit validation, the railcar identifier can be rejected and be transmitted or stored at operation 1222.

At operation 1222, the railcar identifier detection and recognition system 122 can generate an aggregated list of railcar identifiers. For example, the aggregated list of railcar identifiers can comprise the results from one or more of the first method 1209, the second method 1211, or the third method 1215. The aggregated list of railcar identifiers can be stored in on or more databases, modules, or other components of the network environment 100 (FIG. 1).

FIG. 13 is a diagram illustrating a method 1300. The method 1300 can be combined with operations of other methods discussed herein. The method 1300 can include selecting a railcar identifier based on a confidence level, according to one or more examples of the present disclosure. The method 1300 can optionally include operations 1310-1350.

In some examples, at operation 1310, the operation 910 from the method 900 can include receiving a second image that has, or can be likely to have, a railcar identifier for a first railcar. In an example, the second image can be from the same image sensor that transmitted the first image in operation 910. In another example, the second image can be from a second image sensor. In various examples, the second image can include information about the same portion of the same railcar that is represented by the first image. Additionally or alternatively, the second image can be from the second image sensor, and can include a different portion of the same railcar. The different portion of the railcar can include another railcar identifier therein.

At operation 1320, the method 1300 can include analyzing the second image to identify symbols, or characters, of the railcar identifier of the first railcar. This analysis can be completed using the various character recognition and identification methods or operations described herein.

At operation 1330, the method 1300 can include providing a second recognition result with information about the identified characters of the railcar identifier for the first railcar from the second image. For example, the second recognition result can be implemented using any combination of the methods or operations described herein. In some examples, when an earlier or first recognition result and the second recognition result disagree, the system can return an error, and the railcar identifier detection and recognition system 122 (FIG. 1) can request new images be captured, or changes can be made to the bounding boxes within the images to re-analyze the current images. In an example, operation 1330 includes determining or providing an indication of a confidence level about an accuracy of the second recognition result.

At operation 1340, the method 1300 can include comparing a first confidence level and a second confidence level. In examples, the first confidence level can correspond to an earlier or first recognition result, such as comprising the detected railcar identifier from the first image of the method 900. The second confidence level can be the confidence level determined at operation 1330 about the railcar identifier from the second image. At operation 1350, the method 1300 can include selecting a particular railcar identifier based on the identifier associated with a greater confidence level, for example, identified as a result of the comparison in operation 1340.

Figure 14:
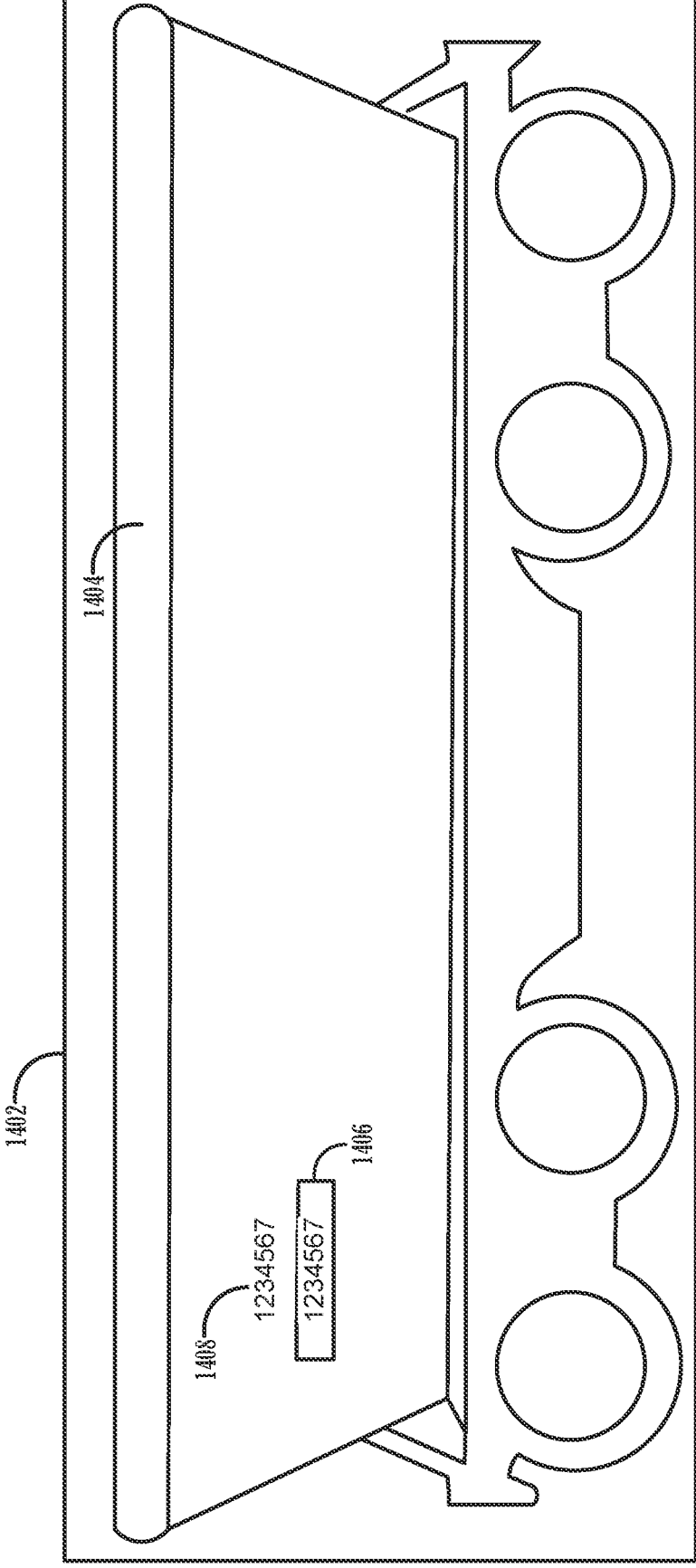
FIG. 14 illustrates an example output display of a system, according to an example of the present disclosure.

FIG. 14 illustrates an example output of the railcar identifier detection and recognition system 122, according to one or more examples of the present disclosure. In an example, the railcar identifier detection and recognition system 122 can output an image 1402. The image 1402 can include a pictorial or photographic representation of the railcar 1401. The railcar 1404 can include a physical indicia of a railcar identifier 1406. That is, the railcar identifier 1406 can be written or printed on the railcar 1404 itself. The image 1402 can include a representative railcar identifier 1408, such as can be overlaid with the representation of the railcar 1404 in the image 1402.

In examples, the image 1402 can be manually verified, so it can be confirmed that the railcar identifier 1406 and the representative railcar identifier 1408 agree and can be used for future training of the components of the network environment 100. In another example, the image 1402 can be stored in a database (e.g., the database 410 of FIG. 4)) such that the image 1402 can be referenced or compared later. For example, the image 1402 can be compared to a current reading of the railcar to determine whether the railcar identifier has eroded, faded, become damaged, or the like, and if the physical railcar identifier 1406 on the railcar 1404 may need some attention (e.g., to be fixed or replaced).

In an example, a clarity score can be associated with the image 1402 to indicate a relative visibility of the railcar identifier 1406 in the image 1402. In examples, the railcar identifier detection and recognition system 122 can compare a clarity score for a given image to a specified threshold clarity score. An alarm or signal can be provided (e.g., to a system operator) when an image has a clarity score above or below the threshold clarity score, which can indicate that there is an issue with one or more image sensors or cameras of the system, or with the physical railcar identifier of a particular railcar.

FIG. 15 is a diagram illustrating a method 1500 of determining a railcar identifier recognition result, according to one or more examples of the present disclosure. In examples, the method 1500 can include operations 1510-1550.

In some examples, at operation 1510, the method 1500 can include receiving a first railcar data set from a first image capture device. In examples, the first railcar data set can include a first image of a portion of a first railcar. The first image can include a representation of a first railcar identifier.

At operation 1520, the method 1500 can include receiving a second railcar data set from a second image capture device. In examples, the second railcar data set can include a second image of a portion of an unknown railcar. The second image can include a representation of a second railcar identifier.

At operation 1530, the method 1500 can include using the representation of the first railcar identifier and identifying one or more symbols or characters in the first railcar identifier. At operation 1540, the method 1500 can include using the representation of the second railcar identifier and identifying one or more symbols or characters in the second railcar identifier.

At operation 1550, the method 1500 can include determining a railcar identifier recognition result for the first railcar based on a correspondence between the identified symbols or characters in the first and second railcar identifiers.

In some examples, the respective fields of view of the first camera and the second camera can be non-overlapping. In some examples, the first camera can be in a first location adjacent to a railroad. The second camera can be in a second location adjacent to the railroad. In some examples, the first location can be upstream of the second location. In some examples, the first camera can be configured to capture an image of a first side of the first railcar. The second camera can be configured to capture an image of a second side of the first railcar. In some examples, the first camera and the second camera can be configured to capture respective images of the same side of the first railcar. Accordingly, operation 1550 of the method 1500 can include using the recognition results (e.g., from operations 1530 and 1540) to determine whether the same railcar (e.g., the first railcar) was identified at the first and second locations. Railcars can thus be automatically tracked throughout a rail system, such as using the systems and methods discussed herein.

Figure 16:
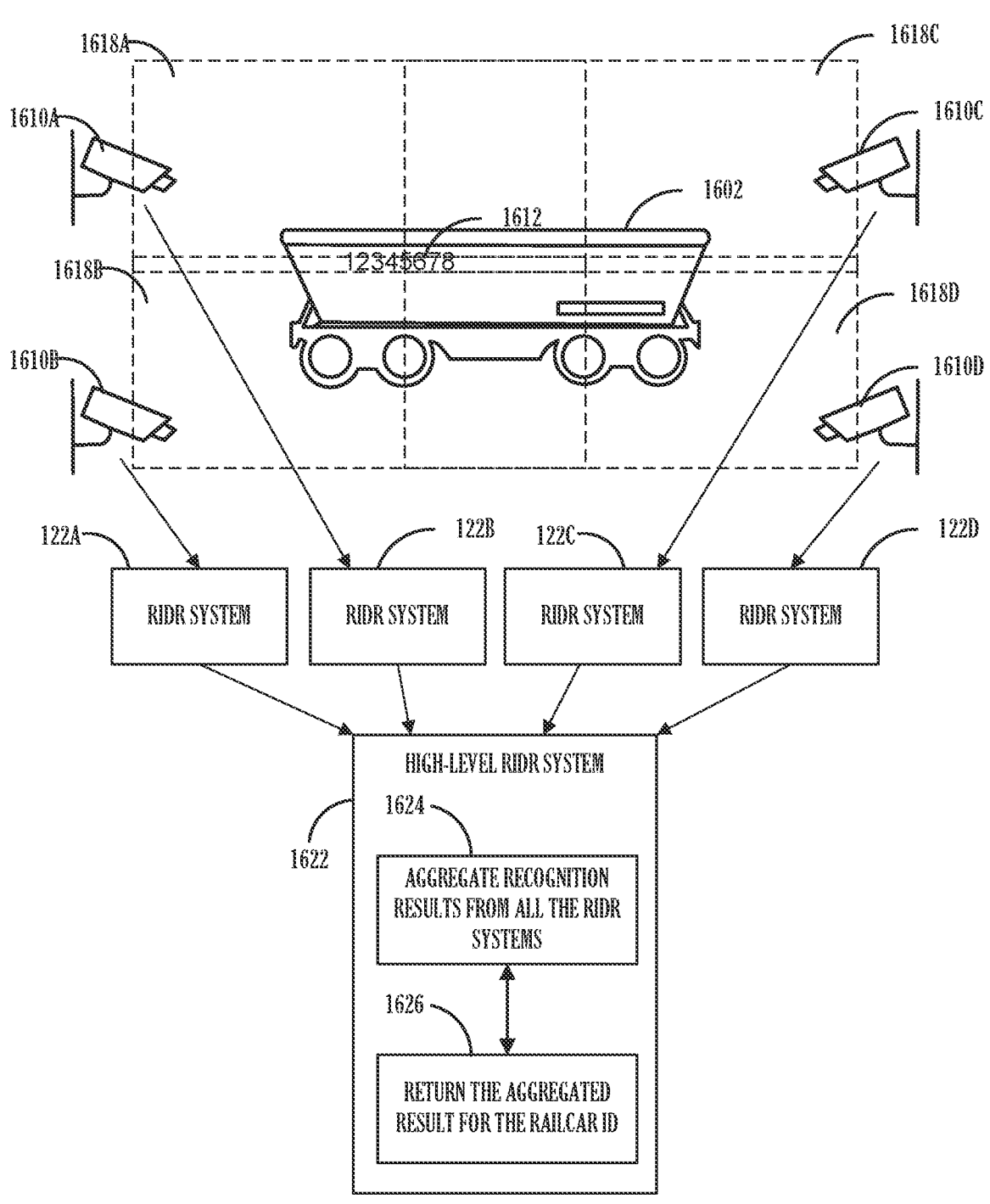
FIG. 16 illustrates a railcar identifier recognition system with multiple cameras, according to one or more examples of the present disclosure.

FIG. 16 illustrates a multiple-camera example of a railcar identifier detection and recognition system 1622, according to one or more examples of the present disclosure. The railcar identifier detection and recognition system 1622 can include cameras (e.g., a first camera 1610A, a second camera 1610B, a third camera 1610C, and a fourth camera 1610D, which can be discussed together as cameras 1610). In examples, the cameras 1610 can be provided at or along a railway such that the respective fields of view 1618 of the cameras (e.g., a first field of view 1618A for the first camera 1610A, a second field of view 1618B for the second camera 1610B, and so on) each captures images of a different portion of a railcar 1602. The railcar 1602 can include a railcar identifier 1612 (e.g., a physical indicia on or coupled to the railcar 1602).

In the example in FIG. 16, the first field of view 1618A of the first camera 1610A, the second field of view 1618B of the second camera 1610B, the third field of view 1618C of the third camera 1610C, and the fourth field of view 1618D of the fourth camera 1610D, can overlap such that the fields of view 1618 can cover an entire side of the railcar 1602. In another example, the views 1618 can be configured such that they do not overlap, and each individual view 1618 can be configured to capture a unique portion or different respective portion of the railcar 1602. In another example, each of the views 1618 can be configured to capture the same portion of the railcar. For example, if the railcar identifier 1612 is in a common region of the railcar 1602, then the views 1618 of the cameras 1610 can be directed at that region of the railcar 1602. In another example, a first camera of the cameras 1610 can be at a first position which is upstream (e.g., relative to a direction of travel of the railcar 1602) of a position of a second camera of the cameras 1610.

In the example in FIG. 16, the first camera 1610A can be connected to a first railcar identifier detection and recognition (RIDR) system 122A, the second camera 1610B is connected to a second RIDR system 122B, the third camera 1610C can be connected to a third RIDR system 122C, and the fourth camera 16101) can be connected to a fourth RIDR system 1221). In another example, one or more of the cameras 1610 can be connected to one or more of the RIDR systems 122 (e.g., the systems 122A-122D).

Each of the railcar identifier detection and recognition systems 122A-122D can be connected to a high-level railcar identifier detection and recognition (RIDR) system 1622. The railcar identifier detection and recognition system 1622 can be configured to receive one or more images or video streams from a network of RIDR systems, such as from each of the railcar identifier detection and recognition systems 122A-122D. In examples, at operation 1624, the railcar identifier detection and recognition system 1622 can aggregate recognition results from each of the railcar identifier detection and recognition systems (122A, 122B, 122C, and 122D). At operation 1626, the railcar identifier detection and recognition system 1622 can output the aggregated result for one or more railcar identifiers. The result can be used for tracking railcars as they travel throughout a rail system monitored by the RIDR system 1622 or can be used for validation of recognition results for particular railcars.

Figure 17:
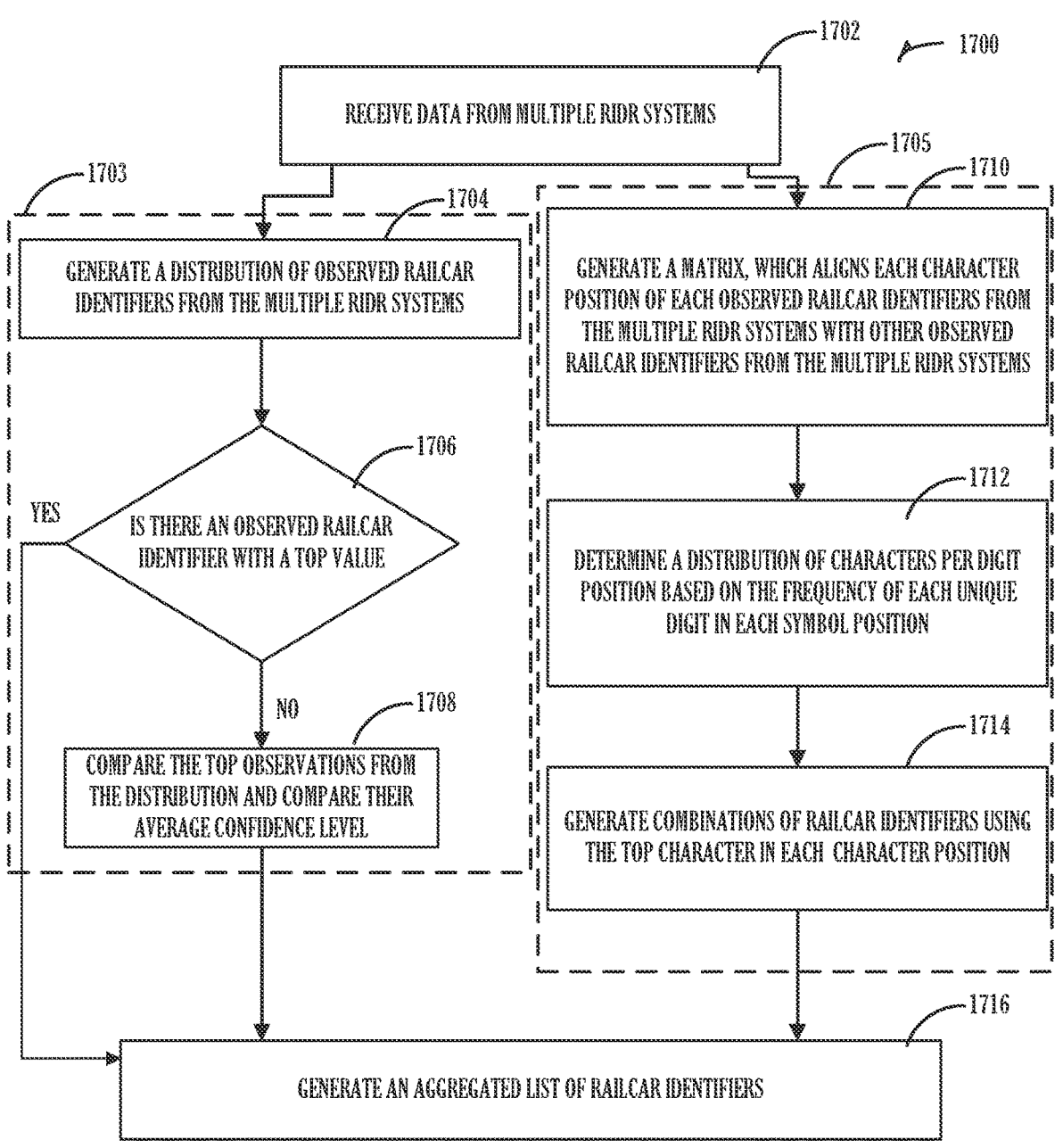
FIG. 17 is a diagram illustrating a method of determining a railcar identifier, according to one or more examples of the present disclosure.

FIG. 17 is a diagram illustrating operations of a method 1700 for determining a railcar identifier, according to one or more examples of the present disclosure. For example, the method 1700 can include operations describing how the railcar identifier detection and recognition system 1622 (FIG. 16) detects and recognizes railcar identifiers such as from multiple different railcars or data sources. The method 1700 can optionally include one or both of a first method of aggregating railcar identifiers (a first method 1703) or a second method of aggregating railcar identifiers (a second method 1705).

At operation 1702, the method 1700 can include or use the railcar identifier detection and recognition system 1622 to receive data from multiple railcar identifier detection and recognition systems. The data can correspond to multiple different railcars or to data from the same railcar(s) that is received from different cameras or different locations. The collected data can be analyzed by the railcar identifier detection and recognition system 1622 using one or both of the first method 1703 or the second method 1705.

The first method 1703 can include operations 1704-1708. At operation 1704, the method 1700 can include or use the railcar identifier detection and recognition system 1622 to generate a distribution of observed railcar identifiers from the multiple railcar identifier detection and recognition systems.

At operation 1706, the method 1700 can include or use the railcar identifier detection and recognition system 1622 to determine if there is an observed railcar identifier with a top value or most frequent value. For example, the system can be configured to determine whether there is a single railcar identifier that has a highest frequency of detection and recognition from the railcar identifier detection and recognition systems. If there is a single railcar identifier with a highest frequency, that railcar identifier can be used for further operations, such as at operation 1716.

At operation 1708, the first method 1703 can include or use the railcar identifier detection and recognition system 1622 to compare the top observations from the distribution generated by the railcar identifier detection and recognition system 1622 during operation 1704. For example, the railcar identifier detection and recognition system 1622 can compare a confidence level (e.g., an average confidence level) that is associated with each of the identifiers found in the distribution of observed railcar identifiers, and then select for further use or processing the identifier(s) that are associated with a highest confidence level.

The second method 1705 can include operations 1710-1714. At operation 1710, the second method 1705 can include or use the railcar identifier detection and recognition system 1622 to generate a matrix of characters, digits, or other symbols corresponding to each of multiple railcar identifiers. The matrix can be populated such that each symbol or character of each of the observed railcar identifiers occupies a particular position in the matrix. For example, each symbol or character location in the matrix can be aligned with the corresponding symbol or character location of each railcar identifier received by the railcar identifier detection and recognition system 1622 during operation 1702.

At operation 1712, the method 1700 can include or use the railcar identifier detection and recognition system 1622 to determine a distribution of symbols per matrix group (e.g., per column or per row) based on the frequency of each unique character or symbol in each matrix group.

At operation 1714, the method 1700 can include or use the railcar identifier detection and recognition system 1622 to generate combinations of railcar identifiers using the top symbol in each matrix group. Each of the generated combinations of railcar identifiers can optionally include a confidence score (e.g., based on an average confidence score for each symbol that makes up the generated railcar identifiers) to help further prioritize particular symbols.

If there is not a symbol with a greatest frequency, the railcar identifier detection and recognition system can be configured to choose the top N symbols (e.g., two or more symbols) for the particular position based on the confidence levels. The railcar identifier detection and recognition system can then be configured to consult or retrieve information from a database that includes all possible railcar identifiers (e.g., known-good railcar identifiers, such as for a particular rail system) to identify candidate railcar identifiers that correspond to or include the N symbols in their corresponding positions of an identifier taking into consideration check digit validation (if available).

The railcar identifier detection and recognition system can be configured to perform the first method 1703 and the second method 1705, as well as any other method or operation discussed herein, concurrently to expeditiously determine a railcar identifier. At operation 1716, the method 1700 can include or use the railcar identifier detection and recognition system 1622 to generate an aggregated list of railcar identifiers. In examples, the aggregated list can be stored, saved, or referenced in or by any of the components of the network environment 100 (FIG. 1).

FIG. 18 illustrates a block diagram of an example machine 1800 upon which any one or more techniques (e.g., methodologies) discussed herein can perform. Examples, as described herein, can include, or can operate by, logic or a number of components, or mechanisms in the machine 1800. Circuitry (e.g., processing circuitry) is a collection of circuits implemented in tangible entities of the machine 1800 that include hardware (e.g., simple circuits, gates, logic, etc.). Circuitry membership can be flexible over time. Circuitries include members that may, alone or in combination perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1800 follow.

In alternative examples, the machine 1800 can operate as a standalone device or can be connected (e.g., networked) to other machines. In a networked deployment, the machine 1800 can operate in the capacity of a server machine, a client machine, or both in server-client network environments. In an example, the machine 1800 can act as a peer machine in peer-to-peer (P2P) (or other distributed) network environment. The machine 1800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1800 can include a hardware processor 1802 (e.g., a central processing unit (CPU), a graphics processing unit (GPU), a hardware processor core, or any combination thereof), a main memory 1804, a static memory (e.g., memory or storage for firmware, microcode, a basic-input-output (BIOS), unified extensible firmware interface (UEFI), etc.) 1806, and mass storage 1808 (e.g., hard drives, tape drives, flash storage, or other block devices) some or all of which can communicate with each other via an interlink (e.g., bus) 1830. The machine 1800 can further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 can be a touch screen display. The machine 1800 can additionally include a storage device (e.g., drive unit) 1808, a signal generation device 1818 (e.g., a speaker), a network interface device 1820, and one or more sensors 1816, such as a global positioning system (GPS) sensor, compass, accelerometer, or other sensor. The machine 1800 can include an output controller 1828, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

Registers of the processor 1802, the main memory 1804, the static memory 1806, or the mass storage 1808 can be, or include, a machine readable medium 1822 on which is stored one or more sets of data structures or instructions 1824 (e.g., software) embodying or utilized by any one or more of the techniques or functions described herein. The instructions 1824 can also reside, completely or at least partially, within any of registers of the processor 1802, the main memory 1804, the static memory 1806, or the mass storage 1808 during execution thereof by the machine 1800. In an example, one or any combination of the hardware processor 1802, the main memory 1804, the static memory 1806, or the mass storage 1808 can constitute the machine readable media 1822. While the machine readable medium 1822 is illustrated as a single medium, the term "machine readable medium" can include a single medium or multiple media (e.g., a centralized or distributed database, and/or associated caches and servers) configured to store the one or more instructions 1824.

The term "machine readable medium" can include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1822 can be representative of the instructions 1824, such as instructions 1824 themselves or a format from which the instructions 1824 can be derived. This format from which the instructions 1824 can be derived can include source code, encoded instructions (e.g., in compressed or encrypted form), packaged instructions (e.g., split into multiple packages), or the like. The information representative of the instructions 1824 in the machine readable medium 1822 can be processed by processing circuitry into the instructions to implement any of the operations discussed herein. For example, deriving the instructions 1824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1824.

In an example, the derivation of the instructions 1824 can include assembly, compilation, or interpretation of the information (e.g., by the processing circuitry) to create the instructions 1824 from some intermediate or preprocessed format provided by the machine readable medium 1822. The information, when provided in multiple parts, can be combined, unpacked, and modified to create the instructions 1824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1824 can be further transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 1902.11 family of standards known as Wi-Fi®, IEEE 1902.15.4 family of standards, peer-to-peer (P2P) networks, among others. In an example, the network interface device 1820 can include one or more physical jacks (e.g., Ethernet, coaxial, or phone jacks) or one or more antennas to connect to the communications network 1826. In an example, the network interface device 1820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1800, and includes digital or analog communications signals or other intangible medium to facilitate communication of such software. A transmission medium is a machine-readable medium.

The following, non-limiting examples, detail certain aspects of the present subject matter to solve the challenges and provide the benefits discussed herein, among others.

Example 1 is a method of detecting a railcar identifier, the method comprising: receiving, by processing circuitry of a controller, an image captured by an image sensor, the image including an outward-facing side portion of a railcar that comprises at least a portion of the railcar identifier; identifying, within the image, a bounded portion of the image corresponding to the railcar identifier; applying a character recognition process to identify respective values for characters of the railcar identifier using the bounded portion of the image; computing a check digit using the identified values; comparing the computed check digit to a particular one of the identified values of the railcar identifier; providing a first railcar identification result and adjusting the bounded portion of the image when the check digit and the particular one of the identified values of the railcar identifier are unequal; and providing a second railcar identification result when the check digit and the particular one of the identified values of the railcar identifier are equal.

In Example 2, the subject matter of Example 1 includes, wherein identifying the bounded portion of the image corresponding to the railcar identifier and applying the character recognition process comprises using a convolutional neural network.

In Example 3, the subject matter of Example 2 includes, wherein identifying the bounded portion of the image includes using a location detection module, the location detection module based on training data from a user.

In Example 4, the subject matter of Example 3 includes, wherein identifying the bounded portion of the image corresponding to the railcar identifier includes: detecting identification regions in the image, wherein each identification region of the identification regions includes a respective potential railcar identifier; and for each potential railcar identifier: rotating one or more portions of the potential railcar identifier using an alignment algorithm; using the rotated one or more portions, recognizing a sequence of characters using an alphanumeric identifier algorithm; and transmitting, to the controller, the recognized sequence of alphanumeric characters and a recognition confidence value, the recognition confidence value indicative of an accuracy of the recognized sequence of characters.

In Example 5, the subject matter of Example 4 includes, wherein detecting the identification regions includes adjusting coordinates of the bounded portion.

In Example 6, the subject matter of Examples 4-5 includes, wherein using the alignment algorithm includes detecting an orientation of the potential railcar identifier and rotating the potential railcar identifier to generate an updated railcar identifier.

In Example 7, the subject matter of Examples 4-6 includes, wherein using the alphanumeric identifier algorithm includes analyzing the image to detect any alphanumeric character within the railcar identifier.

Example 8 is a system for detecting a railcar identifier, the system comprising: an image sensor configured to capture an image including an outward-facing portion of a railcar that includes, at least a portion of the railcar identifier; and a controller coupled to a memory device, the memory device containing instructions that, when executed by a processor circuit of the controller, cause the controller to: receive the image from the image sensor; identify a bounded portion of the image corresponding to the railcar identifier; apply a character recognition process to identify respective values for characters of the railcar identifier using the bounded portion of the image; compute a check digit using the identified values; compare the computed check digit to a particular one of the identified values of the railcar identifier; provide a first railcar identification result and adjust the bounded portion of the image when the check digit and the particular one of the identified values of the railcar identifier are unequal; and provide a second railcar identification result when the check digit and the particular one of the identified values of the railcar identifier are equal.

In Example 9, the subject matter of Example 8 includes, wherein the controller is configured to apply a convolutional neural network to identify the bounded portion of the image corresponding to the railcar identifier and to apply the character recognition process to identify the values for characters of the railcar identifier.

In Example 10, the subject matter of Example 9 includes, wherein the instructions to cause the controller to identify the bounded portion of the image corresponding to the railcar identifier comprise instructions to use a location module trained by a user.

In Example 11, the subject matter of Example 10 includes, wherein the instructions cause the controller to: detect identification regions in the image, wherein each identification region of the identification regions includes a respective potential railcar identifier; and for each potential railcar identifier: rotate one or more portions of the potential railcar identifier; using the rotated one or more portions, recognize a sequence of characters using an alphanumeric identifier algorithm; and provide the recognized sequence of alphanumeric characters and a recognition confidence value, the recognition confidence value indicative of an accuracy of the potential railcar identifier.

In Example 12, the subject matter of Example 11 includes, wherein the instructions cause the controller to perform a fine-tuning algorithm that adjusts coordinates of the bounded portion of the image.

In Example 13, the subject matter of Examples 11-12 includes, wherein the instructions to rotate the one or more portions of the potential railcar identifier include instructions to detect an orientation of the potential railcar identifier and rotate the potential railcar identifier to generate an updated potential railcar identifier.

In Example 14, the subject matter of Examples 11-13 includes, wherein the alphanumeric identifier algorithm is configured to analyze the image to detect any alphanumeric character within the railcar identifier.

Example 15 is a method of detecting a railcar identifier of a railcar, the method comprising: receiving a first railcar data set from a first image capture device, the first railcar data set including: a first image of a portion of a first railcar, the first image including a representation of a first railcar identifier; receiving a second railcar data set from a second image capture device, the second railcar data set including: a second image of a portion of an unknown railcar, the second image including a representation of a second railcar identifier; using the representation of the first railcar identifier, identifying one or more characters in the first railcar identifier; using the representation of the second railcar identifier, identifying one or more characters in the second railcar identifier; and determining a railcar identifier recognition result for the first railcar based on a correspondence between the identified characters in the first and second railcar identifiers.

In Example 16, the subject matter of Example 15 includes, wherein the first railcar identifier and the second railcar identifier are located in different locations of the same railcar.

In Example 17, the subject matter of Example 16 includes, wherein the first image capture device compiles the first railcar data set from a first set of images captured by a first camera, and wherein the first camera is configured to capture a first portion of the first railcar when the first railcar is at a first railcar location.

In Example 18, the subject matter of Example 17 includes, wherein the second image capture device compiles the second railcar data set from a second set of images captured by a second camera, and wherein the second camera is configured to capture a second portion of the first railcar when the first railcar is at a second railcar location.

In Example 19, the subject matter of Example 18 includes, wherein respective fields of view of the first camera and the second camera are non-overlapping.

In Example 20, the subject matter of Example 19 includes, wherein the first camera is located in a first location along a railroad, and wherein the second camera is located in a second location along the railroad.

In Example 21, the subject matter of Example 20 includes, wherein the first location along the railroad is upstream the second location along the railroad.

In Example 22, the subject matter of Examples 20-21 includes, wherein the first camera is configured to capture an image of a first side of the first railcar, and wherein the second camera is configured to capture an image of a second side of the first railcar.

In Example 23, the subject matter of Examples 20-22 includes, wherein the first camera and the second camera are configured to capture respective images of the same side of the first railcar.

In Example 24, the subject matter of Examples 18-23 includes, wherein the first railcar data set comprises a first confidence level, and wherein the second railcar data set comprises a second confidence level, wherein the confidence levels indicate a perceived accuracy of rail car identifiers found in the first data set and the second data set, respectively.

In Example 25, the subject matter of Example 24 includes, comparing the first confidence level and the second confidence level to identify a highest confidence level; and determining the railcar identifier recognition result based on the railcar data set corresponding to the highest confidence level.

In Example 26, the subject matter of Examples 24-25 includes, storing the railcar identifier and the first railcar data set; comparing a third rail data set, received from the first image capture device, with the first railcar data set, the third rail data set including a third railcar identifier; determining a degradation of the railcar identifier on condition that the third railcar identifier has a lower confidence level than the first railcar identifier; and transmitting information about degradation of the railcar identifier.

Example 27 is a system for detecting a railcar identifier of a railcar, the system comprising: a first image capture device configured to capture a first railcar data set, the first railcar data set including: a first image of a portion of a first railcar, the first image including a representation of a first railcar identifier; a second image capture device configured to capture a second railcar data set, the second railcar data set including: a second image of a portion of an unknown railcar, the second image including a representation of a second railcar identifier; and a controller coupled to a memory device, the memory device containing instructions that, when executed by the controller, cause the system to: receive the first railcar data set from the first image capture device; receive the second railcar data set from the second image capture device; using the representation of the first railcar identifier, identify one or more characters in the first railcar identifier; using the representation of the second railcar identifier, identify one or more characters in the second railcar identifier; and determine a railcar identifier recognition result for the first railcar based on a correspondence between the identified characters in the first and second railcar identifiers.

In Example 28, the subject matter of Example 27 includes, wherein the first image capture device compiles the first railcar data set from a first set of images captured by a first camera, and wherein the first camera is configured to capture a first portion of the first railcar when the first railcar is at a first railcar location.

In Example 29, the subject matter of Example 28 includes, wherein the second image capture device compiles the second railcar data set from a second set of images captured by a second camera, and wherein the second camera is configured to capture a second portion of the first railcar when the first railcar is at the first railcar location or at a second railcar location.

In Example 30, the subject matter of Example 29 includes, wherein respective fields of view of the first camera and the second camera are non-overlapping.

In Example 31, the subject matter of Example 30 includes, wherein the first camera is located in a first location along a railroad, and wherein the second camera is located in a second location along the railroad.

In Example 32, the subject matter of Example 31 includes, wherein the first location along the railroad is upstream the second location along the railroad.

In Example 33, the subject matter of Examples 31-32 includes, wherein the first camera is configured to capture an image of a first side of the first railcar, and wherein the second camera is configured to capture an image of a second side of the first railcar.

In Example 34, the subject matter of Examples 31-33 includes, wherein the first camera and the second camera are configured to capture respective images of the same side of the first railcar.

In Example 35, the subject matter of Examples 29-34 includes, wherein the first railcar data set comprises a first confidence level, and wherein the second railcar data set comprises a second confidence level, wherein the confidence levels indicate a perceived accuracy of rail car identifiers found in the first data set and the second data set, respectively.

In Example 36, the subject matter of Example 35 includes, wherein the memory device contains instructions that, when executed by the controller, cause the system to: compare the first confidence level and the second confidence level to identify a highest confidence level; and determine the railcar identifier recognition result based on the railcar data set corresponding to the highest confidence level.

In Example 37, the subject matter of Examples 35-36 includes, wherein the memory device contains instructions that, when executed by the controller, cause the system to: store the railcar identifier and the first railcar data set; compare a third rail data set, received from the first image capture device, with the first railcar data set, the third rail data set including a third railcar identifier; determine a degradation of the railcar identifier on condition that the third railcar identifier has a lower confidence level than the first railcar identifier; and transmit information about the degradation of the railcar identifier.

Example 38 is a method comprising: at a data input stage of a railcar identification processor, receiving railcar image information including at least an image portion that contains, or is likely to contain, a railcar identifier for a first railcar; at a recognition stage of the railcar identification processor, analyzing the railcar image information to identify characters of the railcar identifier for the first railcar, the analyzing the railcar image information including using two or more of a confidence algorithm, a result frequency algorithm, and a per-character algorithm; and at an output stage of the railcar identification processor, providing a first recognition result with information about the identified characters of the railcar identifier for the first railcar.

In Example 39, the subject matter of Example 38 includes, wherein analyzing the railcar image information includes using the confidence algorithm, wherein the confidence algorithm is configured to receive the railcar image information and provide a first character recognition result with a confidence score that indicates a likelihood that the first character recognition result is accurate.

In Example 40, the subject matter of Examples 38-39 includes, wherein analyzing the railcar image information includes using the result frequency algorithm, wherein the result frequency algorithm is configured to receive multiple preliminary recognition results associated with respective images of the first railcar and provide a result frequency output based on a most-popular result among the multiple preliminary recognition results.

In Example 41, the subject matter of Examples 38-40 includes, wherein analyzing the railcar image information includes using the per-character algorithm, wherein the per-character algorithm is configured to receive the railcar image information and provide a respective recognition result and a respective confidence indicator for each of multiple characters in the first railcar identifier.

In Example 42, the subject matter of Examples 38-41 includes, receiving a second image that contains, or is likely to contain, the railcar identifier for the first railcar; analyzing the second image to identify characters of the railcar identifier of the first railcar; and providing a second recognition result with information about the identified characters of the railcar identifier for the first railcar from the second image.

In Example 43, the subject matter of Example 42 includes, wherein when the recognition result and the second recognition result are not in agreement, the method comprises: comparing a first confidence level and a second confidence level; and selecting the railcar identifier based on the identifier associated with a greater confidence level.

In Example 44, the subject matter of Examples 42-43 includes, receiving a first check digit validation from the first recognition result; and receiving a second check digit validation from the second recognition result; wherein the first check digit validation and the second check digit validation indicate a check digit to verify accuracy of the first recognition result and the second recognition result, respectively.

In Example 45, the subject matter of Example 44 includes, wherein when the first recognition result and the second recognition result are not in agreement, the method comprises: verifying a validity of the recognition result and the second recognition result on condition that the recognition result includes the first check digit validation and the second recognition result includes a second check digit validation, respectively; and determining the railcar identifier based on a higher confidence level between the first confidence level and the second confidence level.

In Example 46, the subject matter of Examples 42-45 includes, receiving a third recognition result, the third recognition result including a third railcar identifier; preparing an updated distribution of the first recognition result, the second recognition result, and the third recognition result, the updated distribution sorting the first recognition result, the second recognition result, and the third recognition result to find a frequency of the recognition results; and determining a railcar identifier based on a railcar identifier with a highest frequency in the updated distribution.

In Example 47, the subject matter of Examples 42-46 includes, receiving a third recognition result, each of the first recognition result, the second recognition result, and the third recognition result having a respective group of symbols or characters; preparing a character matrix with character positions that are respectively populated by the symbols or characters corresponding to the first recognition result, the second recognition result, and the third recognition result, wherein a first symbol or character of each result is indexed to the same row or same column of the matrix; and generating a generated railcar identifier using the highest frequency symbol or character at each character position of the matrix.

Example 48 is a system for identifying a railcar identifier of a railcar, the system comprising: an image sensor configured to capture railcar image information including at least an image portion that contains, or is likely to contain, a railcar identifier for a first railcar; a memory device containing instructions; and a controller coupled to the memory device, the controller executes the instructions to operate the controller between: a data input stage, in the data input stage, the instructions cause the controller to: receive the railcar image information; a recognition stage, in the recognition stage, the instructions cause the controller to: analyze the railcar image information to identify characters of the railcar identifier for the first railcar, the analyzing the railcar image information including using two or more of a confidence algorithm, a result frequency algorithm, and a per-character algorithm; and a data output stage, in the data output stage, the instructions cause the controller to: provide a first recognition result with information about the identified characters of the railcar identifier for the first railcar.

In Example 49, the subject matter of Example 48 includes, wherein analyzing the railcar image information includes using the confidence algorithm, wherein the confidence algorithm is configured to receive the railcar image information and provide a first character recognition result with a confidence score that indicates a likelihood that the first character recognition result is accurate.

In Example 50, the subject matter of Examples 48-49 includes, wherein analyzing the railcar image information includes using the result frequency algorithm, wherein the result frequency algorithm is configured to receive multiple preliminary recognition results associated with respective images of the first railcar and provide a result frequency output based on a most-popular result among the multiple preliminary recognition results.

In Example 51, the subject matter of Examples 48-50 includes, wherein analyzing the railcar image information includes using the per-character algorithm, wherein the per-character algorithm is configured to receive the railcar image information and provide a respective recognition result and a respective confidence indicator for each of multiple characters in the first railcar identifier.

In Example 52, the subject matter of Examples 48-51 includes, wherein the instructions, when executed by the controller, configure the controller to: receive a second image that contains, or is likely to contain, the railcar identifier for the first railcar; analyze the second image to identify characters of the railcar identifier of the first railcar; and provide a second recognition result with information about the identified characters of the railcar identifier for the first railcar from the second image.

In Example 53, the subject matter of Example 52 includes, wherein when the recognition result and the second recognition result are not in agreement, the instructions, when executed by the controller, configure the controller to: compare a first confidence level and a second confidence level; and select the railcar identifier based on the identifier associated with a greater confidence level.

In Example 54, the subject matter of Examples 52-53 includes, wherein the instructions, when executed by the controller, configure the controller to: receive a first check digit validation from the first recognition result; and receive a second check digit validation from the second recognition result; wherein the first check digit validation and the second check digit validation indicate a check digit to verify accuracy of the first recognition result and the second recognition result, respectively.

In Example 55, the subject matter of Example 54 includes, wherein when the first recognition result and the second recognition result are not in agreement, the instructions, when executed by the controller, configure the controller to: verify a validity of the recognition result and the second recognition result on condition that the recognition result includes the first check digit validation and the second recognition result includes a second check digit validation, respectively; and determine the railcar identifier based on a higher confidence level between the first confidence level and the second confidence level.

In Example 56, the subject matter of Examples 52-55 includes, wherein the instructions, when executed by the controller, configure the controller to: receive a third recognition result, the third recognition result including a third railcar identifier; prepare an updated distribution of the first recognition result, the second recognition result, and the third recognition result, the updated distribution sorting the first recognition result, the second recognition result, and the third recognition result to find a frequency of the recognition results; and determine a railcar identifier based on a railcar identifier with a highest frequency in the updated distribution.

In Example 57, the subject matter of Examples 52-56 includes, wherein the instructions, when executed by the controller, configure the controller to: receive a third recognition result, each of the first recognition result, the second recognition result, and the third recognition result having a respective group of symbols or characters; prepare a character matrix with character positions that are respectively populated by the symbols or characters corresponding to the first recognition result, the second recognition result, and the third recognition result, wherein a first symbol or character of each result is indexed to the same row or same column of the matrix; and generate a generated railcar identifier using the highest frequency symbol or character at each character position of the matrix.

Example 58 is at least one machine-readable medium including instructions that, when executed by processing circuitry, cause the processing circuitry to perform operations to implement of any of Examples 1-57.

Example 59 is an apparatus comprising means to implement of any of Examples 1-57.

Example 60 is a system to implement of any of Examples 1-57.

Example 61 is a method to implement of any of Examples 1-57.

Example 62 is a system, method, apparatus, or machine-readable medium that can include any element of Examples 1-57.

The above-detailed description includes references to the accompanying drawings, which form a part of the detailed description. The drawings show, by way of illustration, specific examples that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description, with each claim standing on its own as a separate example. The scope of the examples should be determined with reference to the appended claims, along with the full scope of equivalents to which such claims are entitled.

The invention claimed is:

1. A method of detecting a railcar identifier, the method comprising:
    capturing, by an image sensor, an image including an outward-facing portion of a railcar that includes at least a portion of the railcar identifier;
    receiving, by a controller, the image captured by the image sensor;
    identifying, by the controller, a bounded portion of the image corresponding to the railcar identifier;
    applying, by the controller, a character recognition process to identify respective values for characters of the railcar identifier using the bounded portion of the image, the characters being identified individually on a character-by-character basis;
    computing, by the controller, a check digit using the identified values;
    comparing, by the controller, the computed check digit to a particular one of the identified values of the railcar identifier;
    providing, by the controller, a first railcar identification result and adjusting the bounded portion of the image when the check digit and the particular one of the identified values of the railcar identifier are unequal;
    providing, by the controller, a second railcar identification result when the check digit and the particular one of the identified values of the railcar identifier are equal; and
    storing, by the controller, the railcar identifier in a memory device upon matching the check digit with the particular one of the identified values.

2. The method of claim 1, wherein identifying the bounded portion of the image corresponding to the railcar identifier and applying the character recognition process comprises using a convolutional neural network.

3. The method of claim 2, wherein identifying the bounded portion of the image includes using a location detection module, the location detection module based on training data from a user.

4. The method of claim 3, wherein identifying the bounded portion of the image corresponding to the railcar identifier includes:
    detecting identification regions in the image, wherein each identification region of the identification regions includes a respective potential railcar identifier; and
    for each potential railcar identifier:
    rotating one or more portions of the potential railcar identifier using an alignment algorithm;
    using the rotated one or more portions, recognizing a sequence of characters using an alphanumeric identifier algorithm; and
    obtaining, by the controller, the recognized sequence of alphanumeric characters and a recognition confidence value, the recognition confidence value indicative of an accuracy of the recognized sequence of characters.

5. The method of claim 4, wherein detecting the identification regions includes adjusting coordinates of the bounded portion.

6. The method of claim 4, wherein using the alignment algorithm includes detecting an orientation of the potential railcar identifier and rotating the potential railcar identifier to generate an updated railcar identifier.

7. The method of claim 4, wherein using the alphanumeric identifier algorithm includes analyzing the image to detect any alphanumeric character within the railcar identifier.

8. The method of claim 1, wherein applying the character recognition process includes using one or more of: a confidence algorithm, a result frequency algorithm, or a per-character algorithm.

9. The method of claim 8, wherein the confidence algorithm is configured to provide a respective confidence indicator for each of the characters.

10. The method of claim 1, wherein the controller is configured to iteratively attempt to recognize characters inside the bounded portion of the image until the check digit matches the particular one of the identified values.

11. A system for detecting a railcar identifier, the system comprising:

an image sensor configured to capture an image including an outward-facing portion of a railcar that includes at least a portion of the railcar identifier; and a controller coupled to a memory device, the memory device containing instructions that, when executed by a processor circuit of the controller, cause the controller to:

receive the image from the image sensor;

identify a bounded portion of the image corresponding to the railcar identifier;

apply a character recognition process to identify respective values for characters of the railcar identifier using the bounded portion of the image, the characters being identified individually on a character-by-character basis;

compute a check digit using the identified values;

compare the computed check digit to a particular one of the identified values of the railcar identifier;

provide a first railcar identification result and adjust the bounded portion of the image when the check digit and the particular one of the identified values of the railcar identifier are unequal;

provide a second railcar identification result when the check digit and the particular one of the identified values of the railcar identifier are equal; and store the railcar identifier in the memory device upon matching the check digit with the particular one of the identified values.

12. The system of claim 11, wherein the controller is configured to apply a convolutional neural network to identify the bounded portion of the image corresponding to the railcar identifier and to apply the character recognition process to identify the values for characters of the railcar identifier.

13. The system of claim 12, wherein the instructions to cause the controller to identify the bounded portion of the image corresponding to the railcar identifier comprise instructions to use a location module trained by a user.

14. The system of claim 13, wherein the instructions cause the controller to:

detect identification regions in the image, wherein each identification region of the identification regions includes a respective potential railcar identifier; and for each potential railcar identifier:

rotate one or more portions of the potential railcar identifier;

using the rotated one or more portions, recognize a sequence of characters using an alphanumeric identifier algorithm; and provide the recognized sequence of alphanumeric characters and a recognition confidence value, the recognition confidence value indicative of an accuracy of the potential railcar identifier.

15. The system of claim 14, wherein the instructions cause the controller to perform a fine-tuning algorithm that adjusts coordinates of the bounded portion of the image.

16. The system of claim 14, wherein the instructions to rotate the one or more portions of the potential railcar identifier include instructions to detect an orientation of the potential railcar identifier and rotate the potential railcar identifier to generate an updated potential railcar identifier.

17. The system of claim 14, wherein the alphanumeric identifier algorithm is configured to analyze the image to detect any alphanumeric character within the railcar identifier.

18. The system of claim 11, wherein applying the character recognition process includes using one or more of: a confidence algorithm, a result frequency algorithm, or a per-character algorithm.

19. The system of claim 18, wherein the confidence algorithm is configured to provide a respective confidence indicator for each of the characters.

20. The system of claim 11, wherein the controller is configured to iteratively attempt to recognize characters inside the bounded portion of the image until the check digit matches the particular one of the identified values.

* * * * *